United States Patent [19]
Burke et al.

[11] Patent Number: 5,327,558
[45] Date of Patent: Jul. 5, 1994

[54] METHOD FOR ASYNCHRONOUS APPLICATION COMMUNICATION

[75] Inventors: Christopher J. Burke, Maple Valley; Erez Nir, Bellevue; Janice M. Chaffee, Auburn, all of Wash.

[73] Assignee: Motorola, Inc., Schaumburg, Ill.

[21] Appl. No.: 876,889

[22] Filed: Apr. 30, 1992

[51] Int. Cl.[5] .............................................. G06F 13/38
[52] U.S. Cl. ............................ 395/650; 364/DIG. 1; 364/238 S; 364/284.3; 364/270.7
[58] Field of Search ............... 364/DIG. 1 MS File; 395/650, 275, 725

[56] References Cited
U.S. PATENT DOCUMENTS

| | | |
|---|---|---|
| 4,251,865 | 2/1981 | Moore et al. ................. 364/DIG. 1 |
| 4,281,315 | 7/1981 | Bauer et al. .................. 364/DIG. 1 |
| 4,282,399 | 8/1981 | Kippenhan, Jr. et al. ... 364/DIG. 1 |
| 4,870,566 | 9/1989 | Cooper et al. ................ 364/DIG. 1 |
| 5,060,140 | 10/1991 | Brown et al. ................ 364/DIG. 1 |

*Primary Examiner*—Thomas M. Heckler
*Attorney, Agent, or Firm*—Walter W. Nielsen

[57] ABSTRACT

In a general-purpose subscriber unit a data communication method provides management and control functions to allow communication between one of a plurality of software applications and a selected communication device, such as a radio frequency modem. Messages received by the modem may be routed and stored for designated ones of said applications, even if they are not currently active. Likewise, an application operating in background mode may generate messages which are stored, routed, and transmitted through the modem.

9 Claims, 20 Drawing Sheets

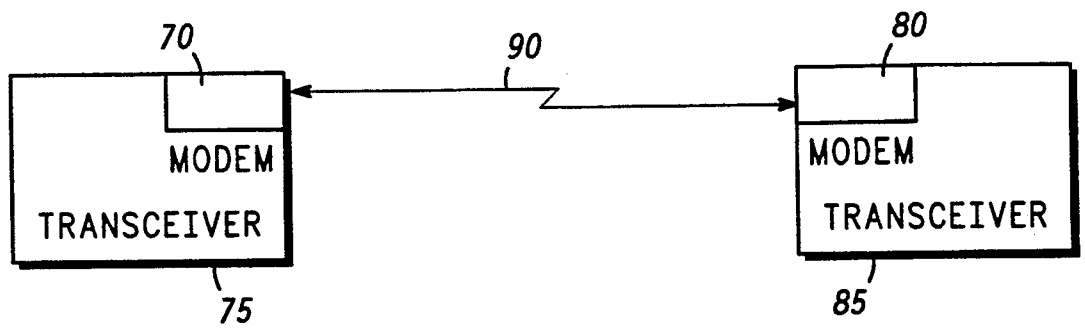
FIG. 20
FIG. 21
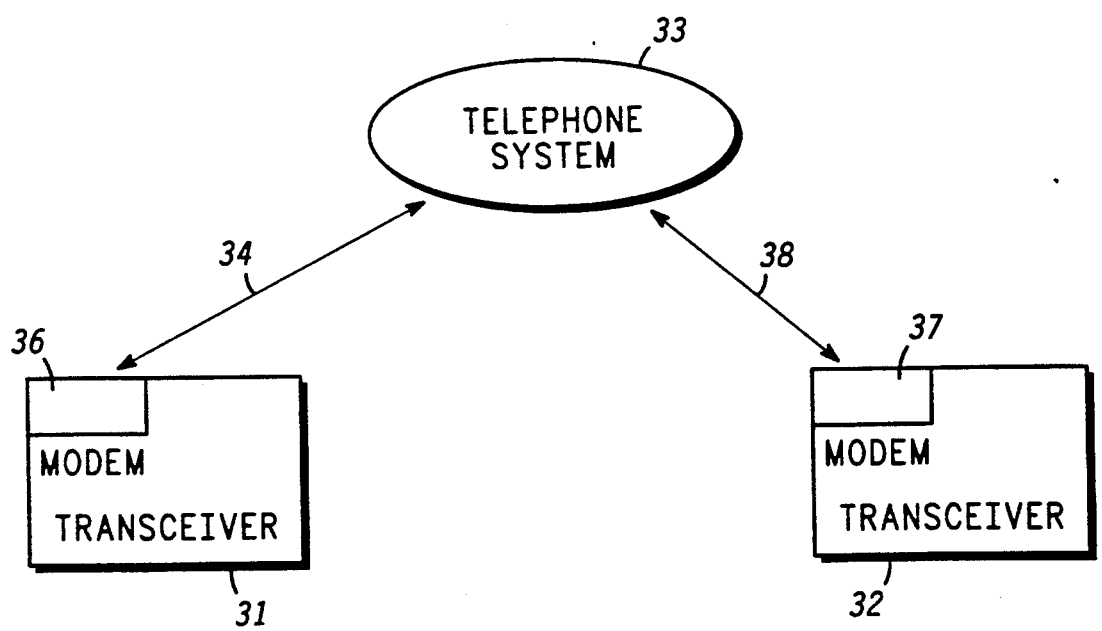

METHOD FOR ASYNCHRONOUS APPLICATION COMMUNICATION

RELATED INVENTIONS

The present invention is related to the following inventions:

(1) "Simultaneous Control Of A Communications Channel In A Multi-Tasking System", having U.S. patent application Ser. No. 07/876,662, filed concurrently herewith, and assigned to the assignee of the present invention.

(2) "Method Of Data Communication For Radio Frequency Modems Requiring Different Communications Protocols", having U.S. patent application Ser. No. 07/876,644, filed concurrently herewith, and assigned to the assignee of the present invention.

(3) "Notification Method For Conserving Current Drain In A Radio Frequency Communication System", having U.S. patent application Ser. No. 07/876,888, filed concurrently herewith, and assigned to the assignee of the present invention.

TECHNICAL FIELD

This invention relates generally to data communication and, in particular, to a method for enabling a general-purpose subscriber unit, such as a portable computer, to receive and transmit messages to and from applications in background mode.

BACKGROUND OF THE INVENTION

In communication systems where each subscriber unit executes one or more application software packages which share a communication device, means are necessary to provide centralized control of the shared device, to loosen coupling between communications functions and applications, to multiplex messages from applications to the device, and to route received messages to the appropriate application. Without such means, messages do not arrive at their intended destinations, either because they become "lost" (the recipient is not there to receive the message) or because they are "ambiguous" (the recipient cannot be identified). Under these conditions, applications malfunction and fail to interoperate.

Thus there is a significant need for communication programs that enable asynchronous communication between any of a plurality of software applications and a selected one of a variety of types of communication devices (e.g. RF modem, telephone modem, etc.).

SUMMARY OF THE INVENTION

The present invention has utility in supporting and providing asynchronous communications between personal computers or personal communicating devices.

The present invention solves the problem of providing independent, asynchronous communication through a shared device. It does this by: a) providing a "run-time engine" that executes autonomously on the subscriber unit, controlling the shared device and sorting, buffering, sending and receiving messages on behalf of "client" software; b) providing a means for multiple clients to interact with a single "run-time engine" without user knowledge or intervention.

The present invention comprises a computer program which runs on a prescribed combination of personal computer hardware and operating system (a preferred embodiment runs on an IBM TM PC clone and the Microsoft TM MS-DOS TM operating system).

The software comprises two components, which are divided by two interfaces.

The first component, called the Library, allows application programs written in a prescribed programming language (e.g. "C" language, as used in the preferred embodiment) to access communication services through a predetermined set of function calls. The Library translates "C" language calling conventions into operating system intertask communication of messages passed between itself and the second component.

The second component, called the Session Manager, manages all interaction with the communication device. The Session Manager accepts messages, previously queued by client applications for transmission, through the shared communication device. The Session Manager accepts messages from the Library, responds by scheduling and performing device-specific control functions (in a preferred embodiment, these functions control one of two similar RF modems which are commercially available from Motorola Mobile Data Division, Bothell, Washington, namely models RPM840C-11 and RPM400i-11) which are needed to perform a communication service described in the message. The Session Manager also enables messages received over the communication device to be sent back to the client application. As it receives messages from the communication device, it stores them in internal memory. The Session Manager conceals from a client application any access to communication services from other client applications.

The API describes how a client communicates using the Invention, without knowledge of other clients. The Library is a software component, which a developer tightly couples (e.g. links) to a client program that needs to use the shared communication device; it converts interface conventions from a prescribed programming language (the API) into messages that can be passed to the Session Manager using a prescribed operating system (the SMSi). The Session Manager is an autonomously executing software component, tightly coupled to a prescribed communication device and loosely coupled to the client (via the SMSI); it performs services on behalf of the client and manages / controls the prescribed communication device.

The invention allows multiple applications to define independent communication paths through the Session Manager, and allows communication activity on any one path at a time. The invention also extends to systems in which the Session Manager allows multiple concurrently active paths.

The invention eliminates the need for an application to remain active during message transmission or reception. The invention performs actual transmission or reception on behalf of the application, even if such application is no longer running. Known technology requires that an application be active throughout a wireless communication transaction.

The invention also relieves client programs of responsibility for real-time and communication management functions by encapsulating these functions in the Session Manager, allowing programs to spend less time running realtime support functions and optimizing realtime functions in the Session Manager.

The Application Programmer's Interface (API) defines a set of conventions for collaboration between a client application and the Session Manager. These conventions take the form of descriptions of communication subroutines and their parameters for a prescribed programming language.

The Session Manager Service Interface (SMSI) defines a set of conventions for the exchange of information between the Library and the Session Manager. These conventions take the form of descriptions of common data formats, a means for moving data structures between the client application's context and the Session Manager's context, and a means (e.g. software interrupts) for passing processor control between a client application and the Session Manager.

The API describes how a client application is to communicate. The Library is a software component which a developer tightly couples (e.g. links) to a client application that needs to communicate; it converts interface conventions from a prescribed programming language (the API) into messages that can be passed to the Session Manager using a prescribed operating system (the SMSI). The Session Manager is an autonomously executing software component, tightly coupled to a prescribed communication device and loosely coupled to the client application (via the SMSI); it performs communication services on behalf of the client application and controls the prescribed communication device.

The present invention enables an application to communicate asynchronously over any of a prescribed set of communication devices, by adhering to the conventions established in the API.

The present invention relieves client applications of responsibility for real-time and communication management functions by encapsulating these functions in the Session Manager, allowing program development by general programmers rather than by communication specialists. Known technology requires the client application programmer to have specialized communication programing knowledge and often real-time programing knowledge.

The present invention provides a means for reducing the manufacturing cost and complexities of a communication device without impacting previously developed applications. Known technology requires modification of applications when reducing device capabilities.

Thus it is an advantage of the present invention to provide a method for enabling any of a plurality of software applications residing on a general-purpose subscriber unit, such as a portable computer, to communicate asynchronously over a communication device, such as a radio frequency (RF) modem.

Yet another advantage of the present invention is to provide communications software which includes real-time and communication management functions, thereby allowing software application development by general programmers rather than by communication specialists.

According to one aspect of the invention, a data processing system comprises a processor, a memory for storing a plurality of applications, at least one of which is not currently executing, and a modem. A method is provided for routing and delivering data messages to any of the applications, independent of user involvement, the method comprising: a) providing a session manager, which enables a plurality of communications channels through the modem; b) receiving a data message from the modem by the session manager; c) storing the message; and d) routing the message to the application upon request, whereby messages may be received and routed asynchronously to inactive applications.

According to another aspect of the invention, a data processing system is provided comprising a processor, a memory for storing a plurality of applications, at least one of which is not currently executing, and a modem. There is provided a method for transmitting data messages from any of the applications, independent of user involvement, the method comprising: a) providing a session manager, which enables a plurality of communications channels through the modem; b) generating a data message by the one application; c) receiving the data message from the application by the session manager; d) storing the message; and e) routing the message to the modem; whereby messages may be generated, routed, and transmitted asynchronously from inactive applications.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 20 shows a block diagram depicting a pair of transceivers communicating via direct radio frequency signals in accordance with another embodiment of the invention.

FIG. 21 shows a block diagram depicting a pair of transceivers communicating via telephone line in accordance with another embodiment of the invention.

DETAILED DESCRIPTION OF A PREFERRED EMBODIMENT

Figure 1:
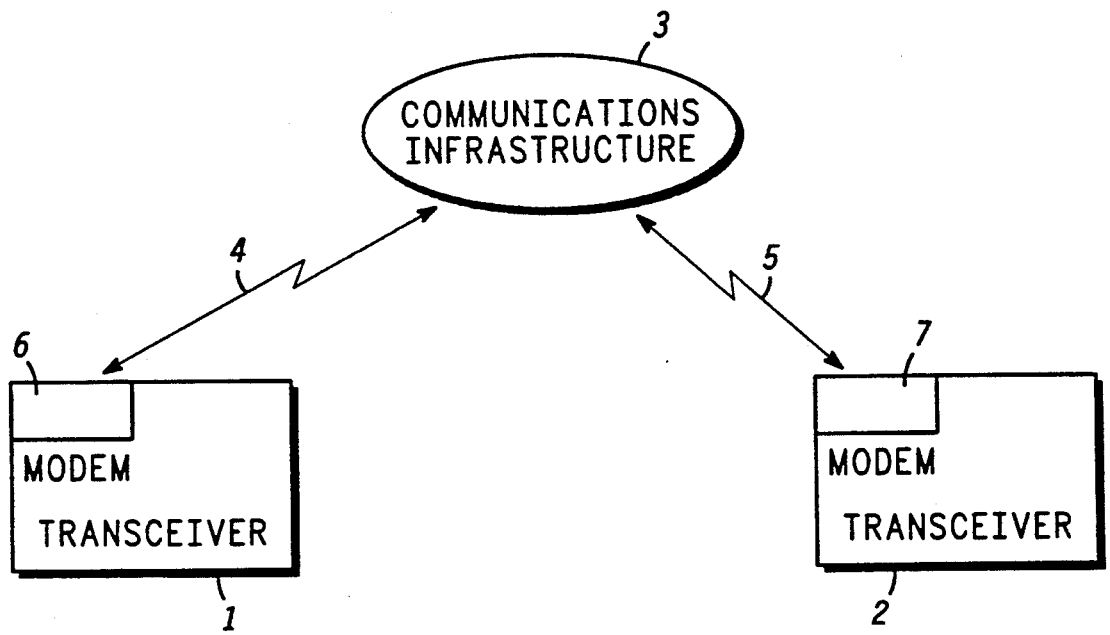
FIG. 1 shows a block diagram depicting a pair of transceivers communicating via radio frequency with a communications infrastructure in accordance with one aspect of the invention.

FIG. 1 shows a block diagram depicting a pair of transceivers 1 and 2 communicating via radio frequency (RF) with a communications infrastructure 3 in accordance with a preferred embodiment of the invention. Device 1 sends and receives RF signals 4 to and from communications infrastructure 3 via modem 6. Communications infrastructure 3 sends and receives RF signals 5 to and from device 2 via modem 7. In this way data is transferred between devices 1 and 2.

Figure 2:
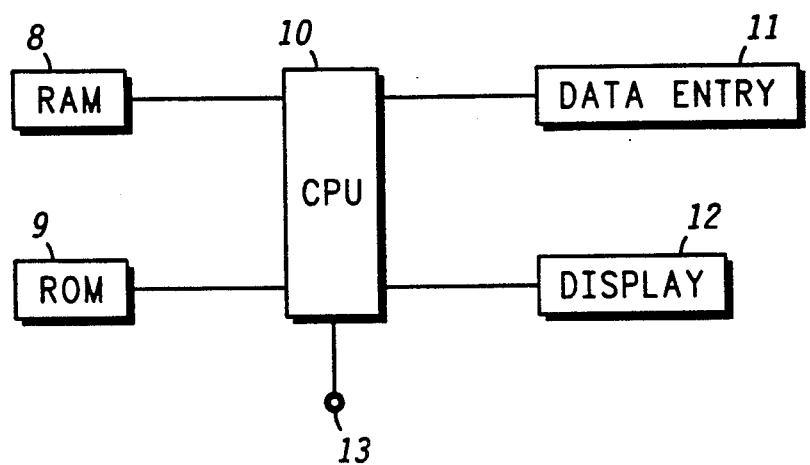
FIG. 2 shows a block diagram of a data processing portion of a communications device in accordance with a preferred embodiment of the invention.

FIG. 2 shows a block diagram of a data processing portion of a communications device in accordance with a preferred embodiment of the invention. The data processing portion is used to carry out the method and comprises central processing unit (CPU) 10, random access memory (RAM) 8, read only memory (ROM) 9, data entry means 11, display 12, and input/output (I/O) terminal 13. Data entry means 11 and display 12 may be any appropriate type to enable a system user to enter data and commands into the system and to receive information from the system. Likewise, CPU 10, RAM 8, and ROM 9 are of suitable design depending upon the system requirements. Data and control information is output to and input from suitable communications equipment (not shown), such as a wire-line modem or RF modem via I/O terminal 13.

Figure 3:
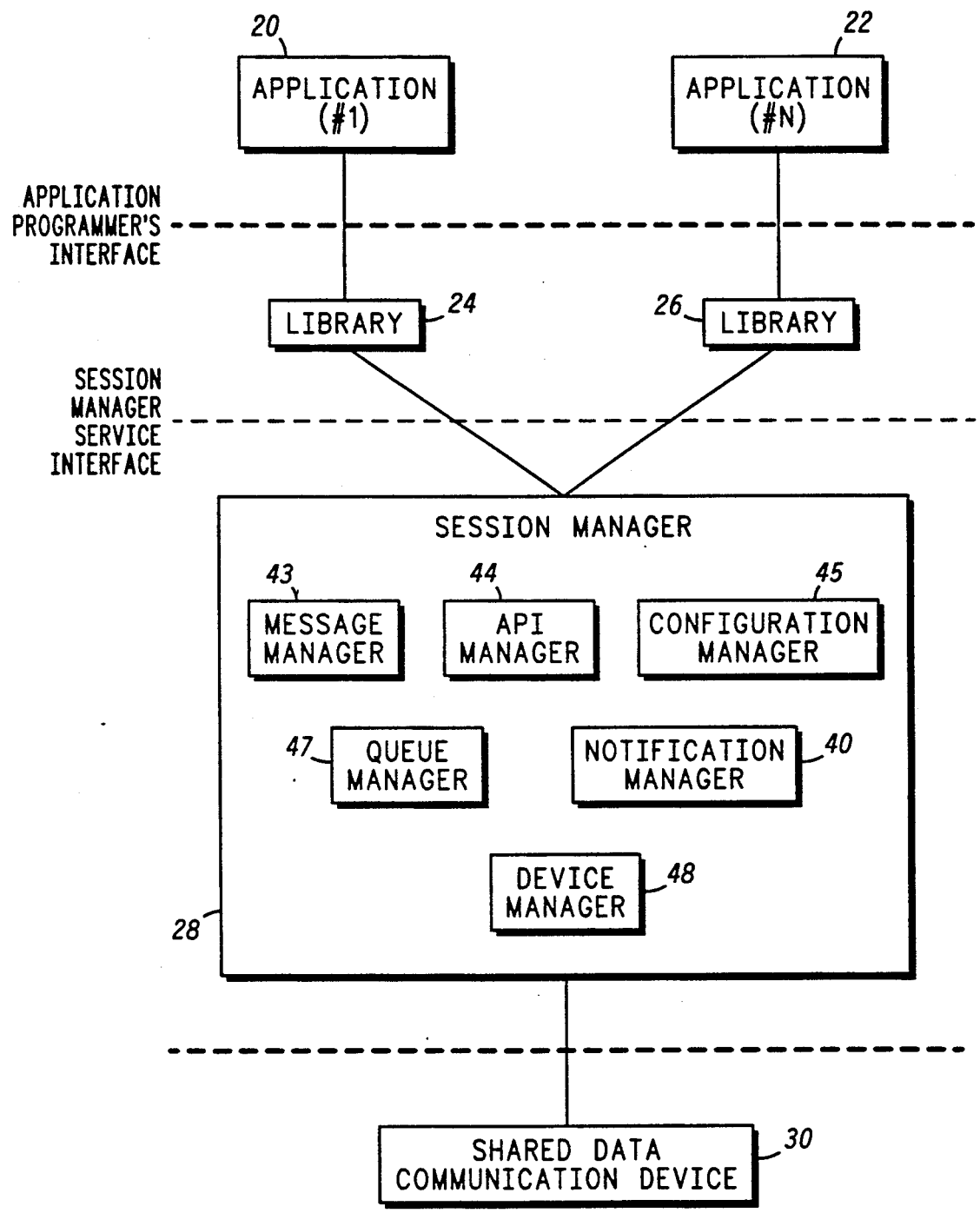
FIG. 3 shows a functional block diagram of a method for controlling concurrent access to a shared data communication device in accordance with a preferred embodiment of the invention.

FIG. 3 shows a functional block diagram of a method for controlling concurrent access to a shared data communication device in accordance with a preferred embodiment of the invention. Different software applications, 20 and 22, are linked to libraries, 24 and 26, of communication routines. The libraries, 24 and 26, allow programs written in a specific programming language to access a communication device through a predetermined set of function calls, as will be explained in greater detail below.

The library comprises a set of functions which are called from within an application. In a preferred embodiment the set of library functions comprises functions such as open—session, close_session, get_message, send_message, get_number_messages, get$_{13}$ notification_config, set_notification_configuration, and get_number_messages. It will be apparent that other library functions may be substituted or added if desired.

The interface between the multiple software applications, 20 and 22, and the libraries, 24 and 26, constitutes the Application Programmer's Interface (API), which defines a set of conventions for collaboration between a software application (e.g., 20) and the Session Manager 28. These conventions take the form of descriptions of communication subroutines and their parameters for a specific programming language, such as 'C'.

The library embodies knowledge both of the programming language in which the corresponding application 20 or 22 is coded, and knowledge of the interface between itself and the Session Manager 28. In the event that both applications are coded in a single programming language (e.g. the 'C' programming language), libraries 24 and 26 are identical in both general and specific detail; under these conditions libraries 24 and 26 may be equivalently replaced by a single, shared library (in another embodiment of the invention, not shown in FIG. 3). In the event that each application is coded in a unique programming language (e.g. box 20 is a 'C' application and box 22 is a 'C++' application using an incompatible compiler) library 24 and library 26 differ from one another in detail but serve equivalent purposes (i.e. embody equivalent API's) for each programming language.

The API describes how software applications 20 and 22 communicate using the invention. The library 24 and 26 is a software component, which is linked to a software application that needs to communicate; it converts interface conventions (the API) from a specific programming language into messages that can be passed to the Session Manager 28 using a prescribed operating system, such as MS-DOS (commercially available from Microsoft Corp., Redmond, WA.), and a prescribed inter-process communication technique, such as software interrupts.

The Session Manager 28 manages all interaction with a shared data communication device 30 and provides the functionality necessary to share the device among several software applications 20 and 22. The Session Manager accepts a message from the library 24 and 26 and responds by scheduling and performing a communication function described in the message. A response is then passed back to the software application 20 and 22.

The Session Manager 28 comprises the Message Manager 43, the API Manager 44, the Configuration Manager 45, the Queue Manager 47, the Notification Manager 40, and the Device Manager 48. These modules work together to provide the queuing, scheduling, and control to enable the Shared Data Communication Device 30 to be shared between software applications 20 and 22, as will be explained in further detail below.

Figure 4:
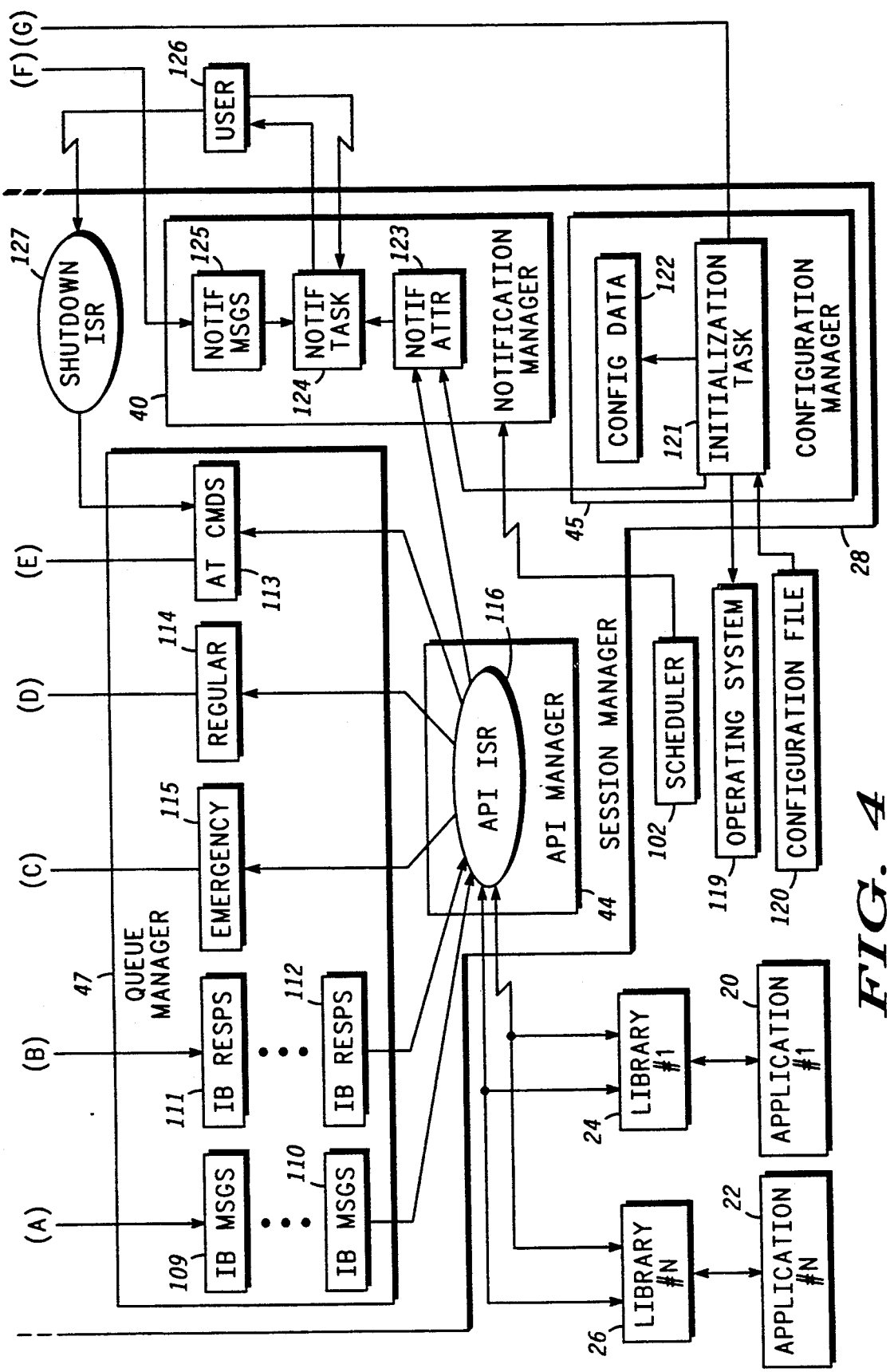
FIGS. 4 and 5 together show a more detailed functional block diagram of a method for controlling concurrent access to a shared data communication device in accordance with a preferred embodiment of the invention.
Figure 5:
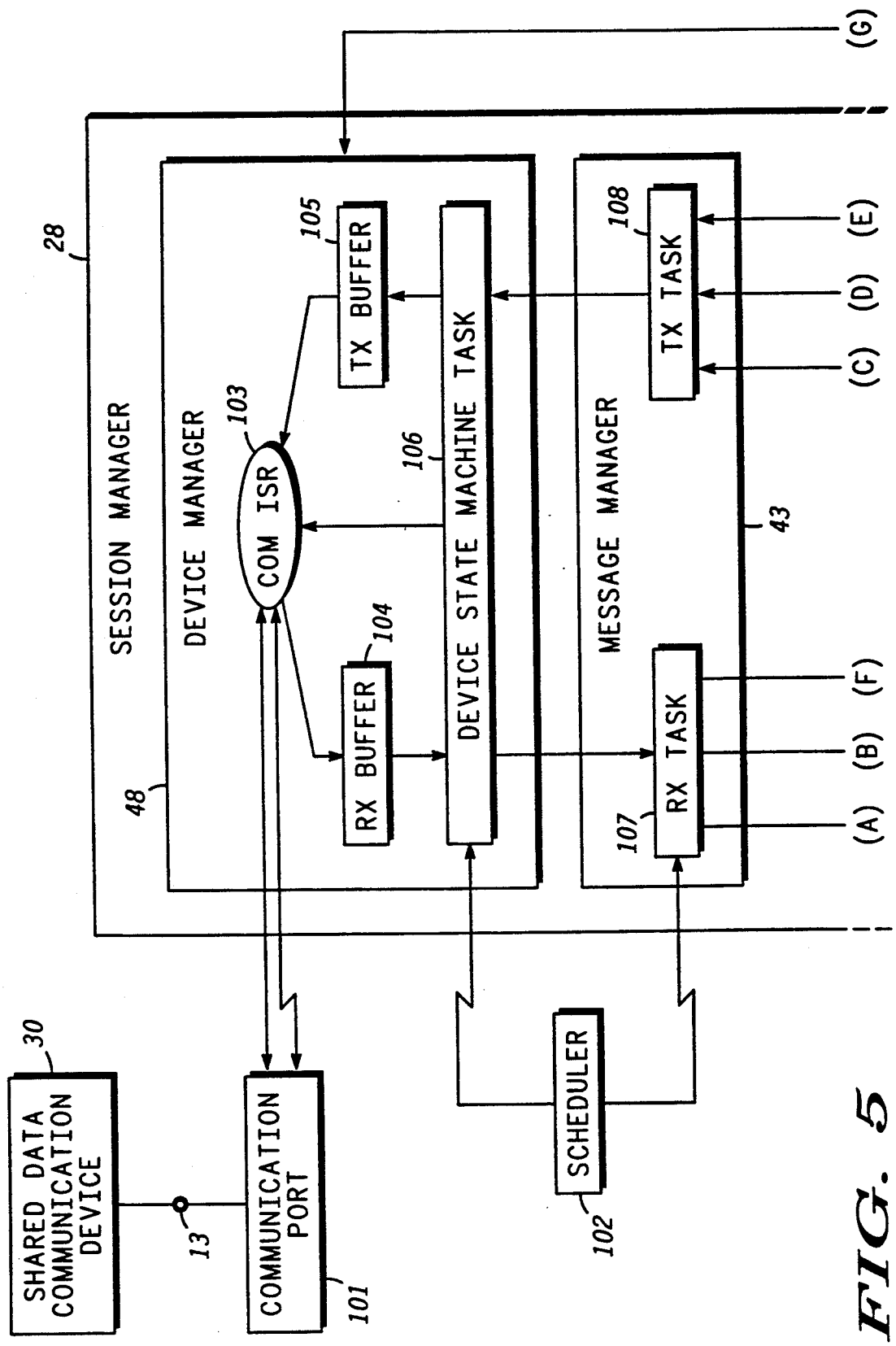

FIGS. 4 and 5 together show a more detailed functional block diagram of a method for controlling concurrent access to a shared data communication device in accordance with a preferred embodiment of the invention.

Referring first to FIG. 4, application 20 interfaces to library 24 via a predetermined set of commands. Library 24 passes data and control information to Session Manager 28 by way of API Manager 44.

API Manager 44 comprises the API Interrupt Service Routine (ISR) 116 which receives in-bound messages and in-bound responses from Queue Manager 47. The API ISR 116 also sends messages with the priorities "emergency" or "regular" and passes Hayes ® Standard AT commands to the Queue Manager 47. The API ISR 116 also sets Notification Attributes 123 in the Notification Manager 40.

The Configuration Manager 45 comprises the Initialization Task 121 and Configuration Data store 122. The Initialization Task 121 reads session attribute data from the Configuration File 120, registers with the Operating System 119 as a Terminate and Stay Resident (TSR) program and writes session attribute data (e.g. baud rate) to Configuration Data store 122. The Initialization Task 121 also initializes the shared communication device via the Device Manager 48 and sets the default attributes in the Notification Attributes data store 123 in the Notification Manager 40.

The Notification Manager 40 comprises the Notification Attributes data store 123, the Notification Task 124, and the Notification Messages data store 125. The Notification Task 124 is periodically scheduled to run by the Scheduler 102, in order to facilitate the control switch between this task and others running on the data processor. The Notification Task 124 reads data from the Notification Attributes data store 123 and reads notification messages from the Notification Messages data store 125. The Notification Task 124 can display a notification message to the User 126. The User 126 can acknowledge the receipt of the notification message by sending a response (e.g. pressing a key on the keyboard) to the Notification Task 124.

The Queue Manager 47 comprises queues 109-110 for in-bound messages, queues 111-112 for in-bound responses to previously sent messages, a data store 115 for out-bound emergency priority messages, a data store 114 for out-bound regular priority messages, and a data store 113 for Hayes ® Standard AT commands used to control the shared communication device. For each session a set of in-bound queues (IB Msgs. 109-110 and IB Resps. 111-112) is allocated. Each application 20, 22 can open multiple sessions, and the Session Manager 28 can support multiple applications 20, 22.

The in-bound message queues 109-110 receive messages from the Receive Task 107 of Message Manager 43 (FIG. 5). The API Manager 44 retrieves the messages in a first-in-first-out (FIFO) manner from the in-bound message queues 109-110. The in-bound message response queues 111-112 receive message responses from the Receive Task 107 of Message Manager 43. The API Manager 44 retrieves the messages in a first-in-first-out (FIFO) manner from the in-bound message response queues 111-112.

The emergency message data store 115 receives emergency messages from the API Manager 44 and stores them for retrieval by the Transmit-Task 108 of the Message Manager 43. The regular message data store 114 receives regular messages from the API Manager 44 and stores them for retrieval by the Transmit Task 108 of the Message Manager 43. The AT Commands data store 113 receives Hayes ® Standard AT commands from the API Manager 44 and stores them for retrieval by the Transmit Task 108 in the Message Manager 43. The AT Commands data store 113 receives device shutdown commands from the Shutdown Interrupt Service Routine (ISR) 127 and stores them for retrieval by the Transmit Task 108 in the Message Manager 43.

Regarding FIG. 5 now, the Message Manager 43 comprises a Receive Task 107 and a Transmit Task 108. The Receive Task 107 retrieves data from the Device Manager 48 and routes the data to the in-bound message queue 109-110 or the in-bound message response queue 111-112 of the Device Manager 48. The Receive Task also writes notification messages to the Notification Manager 40.

The Transmit Task 108 retrieves regular and emergency messages, and Hayes ® Standard AT commands, from the Queue Manager 47 and passes them on to the Device Manager 48. The Message Manager 43 is periodically scheduled to run by a Scheduler 102 interrupt to facilitate the control switch between the Receive and Transmit Tasks.

The Device Manager 48 comprises a Communication (COM) Interrupt Service Routine (ISR) 103, a Receive Buffer 104, a Transmit Buffer 105, and a Device State Machine Task 106. The Device State Machine Task 106 is driven by the Scheduler 102 and controls the message traffic from the Message Manager 43 to/from the Transmit Buffer 105 and the Receive Buffer 104, respectively.

The Device State Machine Task 106 sends commands to the COM ISR 103. The COM ISR 103 sends/receives data bytes to/from the Communication Port 101 and issues/handles hardware interrupts to/from the Communication Port 101. Communication Port 101 is connected to the Shared Data Comm Device 30 via I/O terminal 13.

*Box SESS_MGR*

Figure 6:
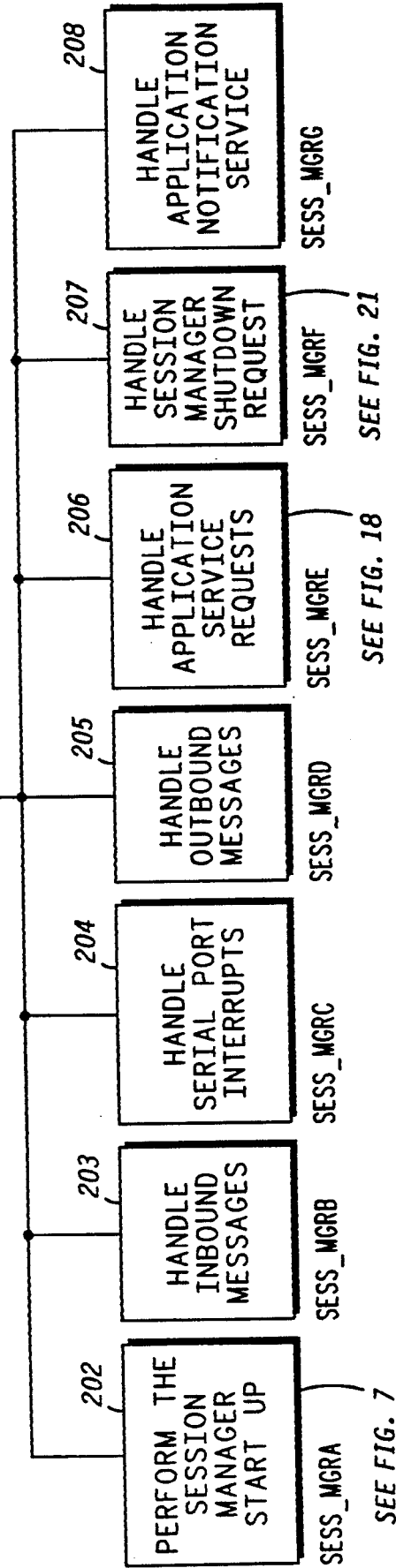
FIG. 6 shows a procedure call-tree for the routine HANDLE SESSION MANAGEMENT in accordance with a preferred embodiment of the invention.

The pseudo-code listing for FIG. 6, a procedure call-tree for the routine HANDLE SESSION MANAGEMENT 201, contains an implementation in pseudo-code of a preferred embodiment of the present invention. The procedure HANDLE SESSION MANAGEMENT 201 calls one or more of the sub-procedures, PERFORM THE SESSION EAGER START UP 202, HANDLE INBOUND MESSAGES 203, HANDLE SERIAL PORT INTERRUPTS 204, HANDLE OUTBOUND MESSAGES 205, HANDLE APPLICATION SERVICE REQUESTS 206, HANDLE SESSION EAGER SHUTDOWN REQUESTS 207, and HANDLE APPLICATION NOTIFICATION SERVICE 208, depending on what type interrupt is received.

```
/* Startup and load manager */
PERFORM THE SESSION MANAGER START UP [A]
/* Terminate and Stay Resident */
```

-continued

```
Exit
/* when an interrupt occurs wake up and process */
CASE OF interrupt DO
   CASE scheduler interrupt :
      IF scheduler interrup is for "received messages"
         THEN
            HANDLE INBOUND MESSAGES [B]
      ENDIF
      IF scheduler interrupt is for "sending messages"
         THEN
            HANDLE OUTBOUND MESSAGES [D]
      ENDIF
      IF scheduler interrupt is for "application notification"
         THEN
            HANDLE APPLICATION NOTIFICATION SERVICE [G]
      ENDIF ENDCASE
   CASE serial port interrupt :
      HANDLE SERIAL PORT INTERRUPTS [C]
   CASE application interrupt :
      HANDLE APPLICATION SERVICE REQUESTS [E]
   CASE user interrupt/hot-key combination :
      HANDLE SESSION MANAGER SHUTDOWN REQUEST [F]
   OTHERS :
      treat error
ENDCASE
```

The Session Manager is loaded and started up by calling the routine PERFORM THE SESSION EAGER STARTUP 202. The Session Manager 28 Terminates and Stays Resident, waiting for an interrupt to occur. The interrupt causes the Session Manager 28 to "wake up" and process the type of interrupt that has occurred.

When a scheduler interrupt occurs, the procedure HANDLE INBOUND MESSAGES 203 is called to handle any received messages, if the scheduler interrupt is for "received messages" The procedure HANDLE OUTBOUND MESSAGES 205 is called to handle any sent (posted) messages, if the scheduler interrupt is for "sending messages". The procedure HANDLE APPLICATION NOTIFICATION SERVICE 208 is called to notify the user or the application when inbound messages arrive, if the scheduler interrupt is for "application notification".

When a serial port interrupt occurs, the procedure HANDLE SERIAL PORT INTERRUPTS 204 is called to handle any event generated by the shared communication device connected through the serial port.

When an application interrupt occurs, the procedure HANDLE APPLICATION SERVICE REQUESTS 206 is called to process the command set from an Application Programmer's Interface.

When a user interrupt ("hot key" combination) occurs, the procedure HANDLE SESSION EAGER SHUTDOWN REQUEST 207 is called to terminate operation of the Session Manager 28 and unload the Session Manager 28 from memory.

The occurrence of any other interrupt is treated as an error.

Box SESS_MGRA

Figure 7:
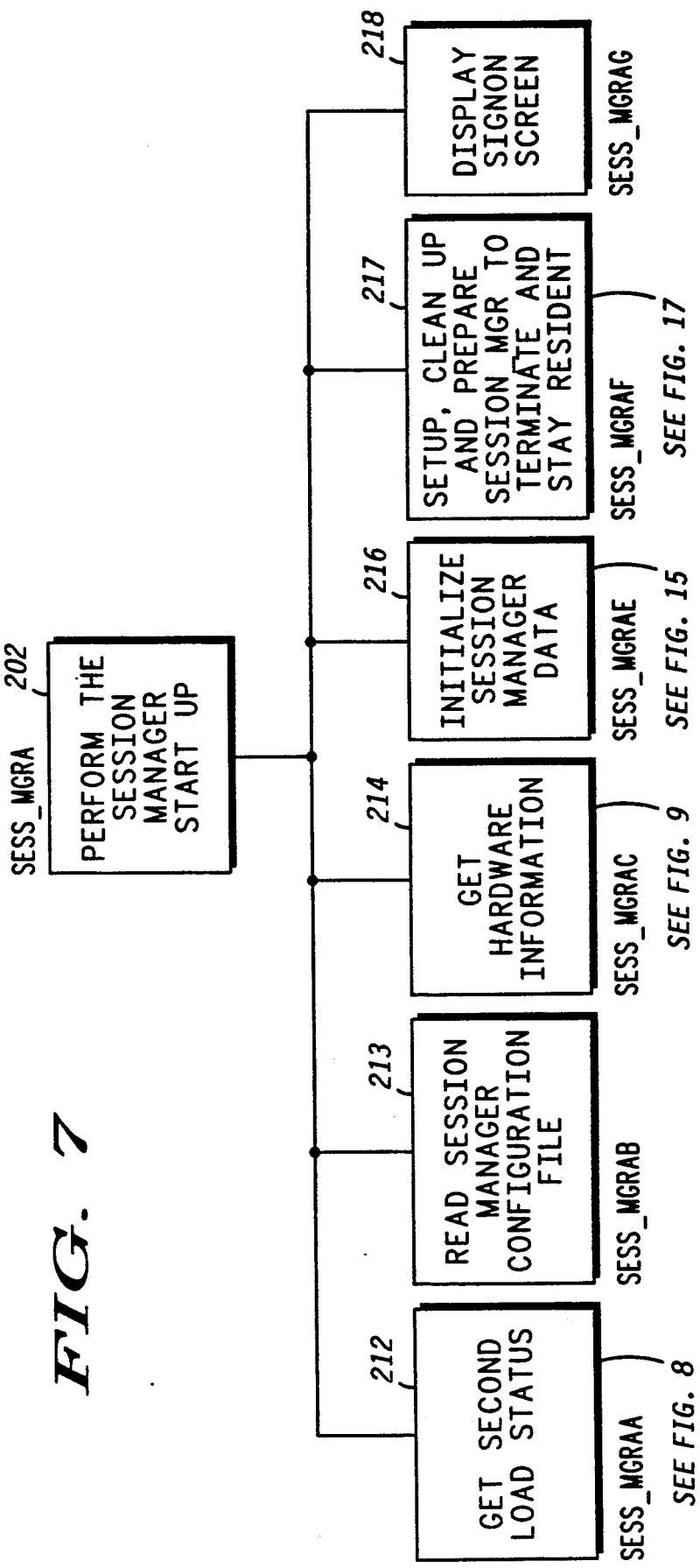
FIG. 7 shows a procedure call-tree for the routine PERFORM THE SESSION EAGER START UP in accordance with a preferred embodiment of the invention.

The pseudo-code listing for FIG. 7 comprises a procedure call-tree for the routine PERFORM THE SESSION MANAGER START UP 202. The procedure PERFORM THE SESSION EAGER START UP 202 calls the sub-procedures, GET SECOND LOAD STATUS 212, READ SESSION MANAGER CONFIGURATION FILE 213, GET HARDWARE INFORMATION 214, INITIALIZE SESSION MANAGER DATA 216, SETUP, CLEAN UP, AND PREPARE SESSION_MGR TO TERMINATE AND STAY RESIDENT 217, and DISPLAY SIGNON SCREEN 218, in the sequence indicated in the pseudo-code listing below.

```
GET SECOND LOAD STATUS [A]
READ SESSION MANAGER CONFIGURATION FILE [B]
GET HARDWARE INFORMATION [C]
INITIALIZE SESSION MANAGER DATA [E]
SETUP,CLEAN UP AND PREPARE SESSION_MGR TO TERMINATE AND STAY RESIDENT [F]
DISPLAY SIGNON SCREEN [G]
                                    Box SESS_MGRAA
```

Figure 8:
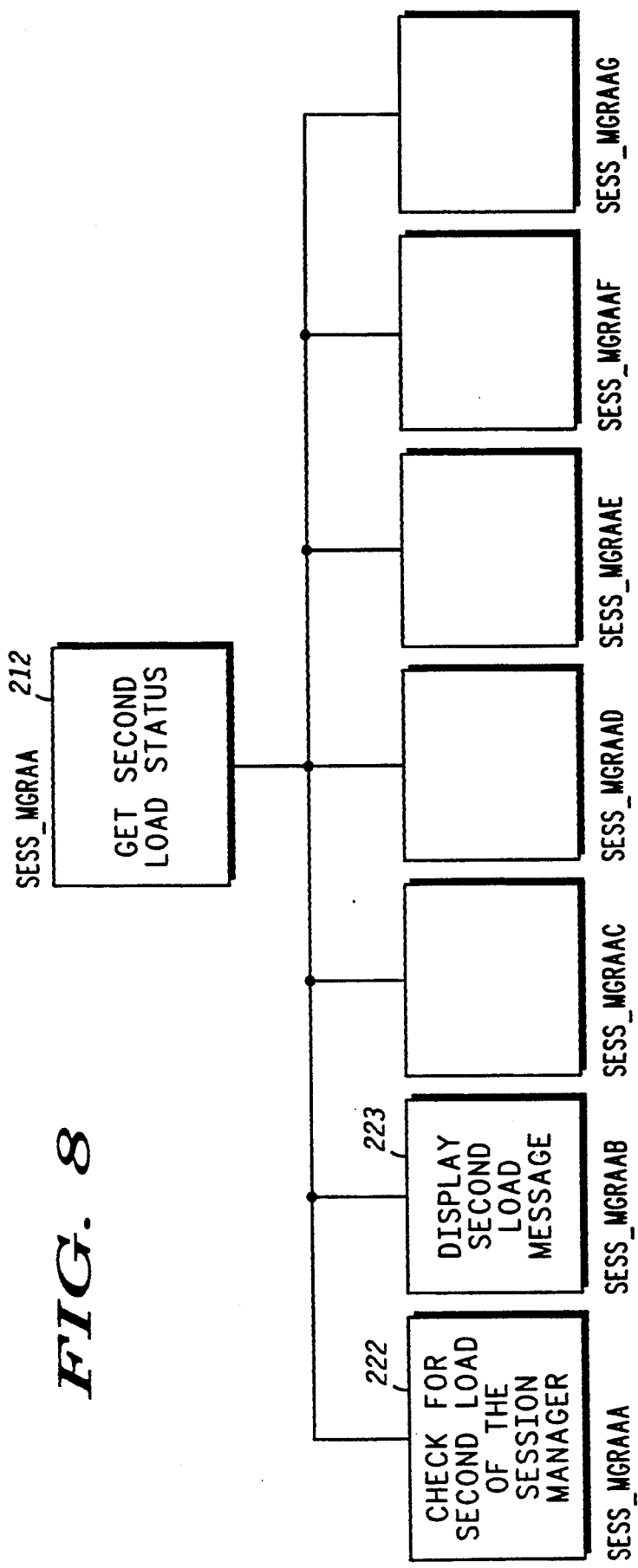
FIG. 8 shows a procedure call-tree for the routine GET SECOND LOAD STATUS in accordance with a preferred embodiment of the invention.

The pseudo-code listing for FIG. 8 comprises a procedure call-tree for the routine GET SECOND LOAD STATUS 212. The procedure GET SECOND LOAD STATUS 212 calls the sub-procedures, CHECK FOR SECOND LOAD OF THE SESSION MANAGER 222 and DISPLAY SECOND LOAD MESSAGE 223, to account for the situation that the Session Manager was loaded twice for execution.

```
already_loaded = CHECK FOR SECOND LOAD OF THE SESSION MANAGER [A]
IF already_loaded
   THEN DISPLAY SECOND LOAD MESSAGE [B]
      exit
ENDIF
```

The routine CHECK FOR SECOND LOAD OF THE SESSION MANAGER 222 (FIG. 8) verifies that the Session Manager 28 (FIG. 4) is not already loaded into memory, RAM 8 (FIG. 2).

Box SESS_MGRAAB

The routine DISPLAY SECOND LOAD MESSAGE 223 (FIG. 8) displays a message to the User 126 (FIG.4) that the Session Manager 28 (FIG. 4) load was attempted twice.

Box SESS_MGRAB

The pseudo-code listing for READ SESSION MANAGER CONFIGURATION FILE 213 (FIG. 7) is shown below. The Session Manager Configuration File 120 (FIG. 4) is opened. If it is opened without error, then storage is allocated for the Configuration Data Store 122. Parameters, such as communication parameters and notification attributes, are read from the Session Manager Configuration File 120 and written to the Configuration Data Store 122 and the Notification Attributes Data Store 123. If the Session Manager Configuration File 120 is opened with errors, an error message is displayed.

```
IF Open session manager configuration file = OK
  THEN
    Allocate data structure for session manager configuration data
    Read global parameters
      Hot-key character
      Communication parameters(COM Port, Baud rate)
      Size of inbound queue (i.e. maximum number of stored messages)
    Read applications' configuration:
      Allication's session name
      Notification attributes (pop-up,tone,interval)
      Fixed user header
  ELSE
    Display error message
    exit
  ENDIF
                Box SESS_MGRAC
```

Figure 9:
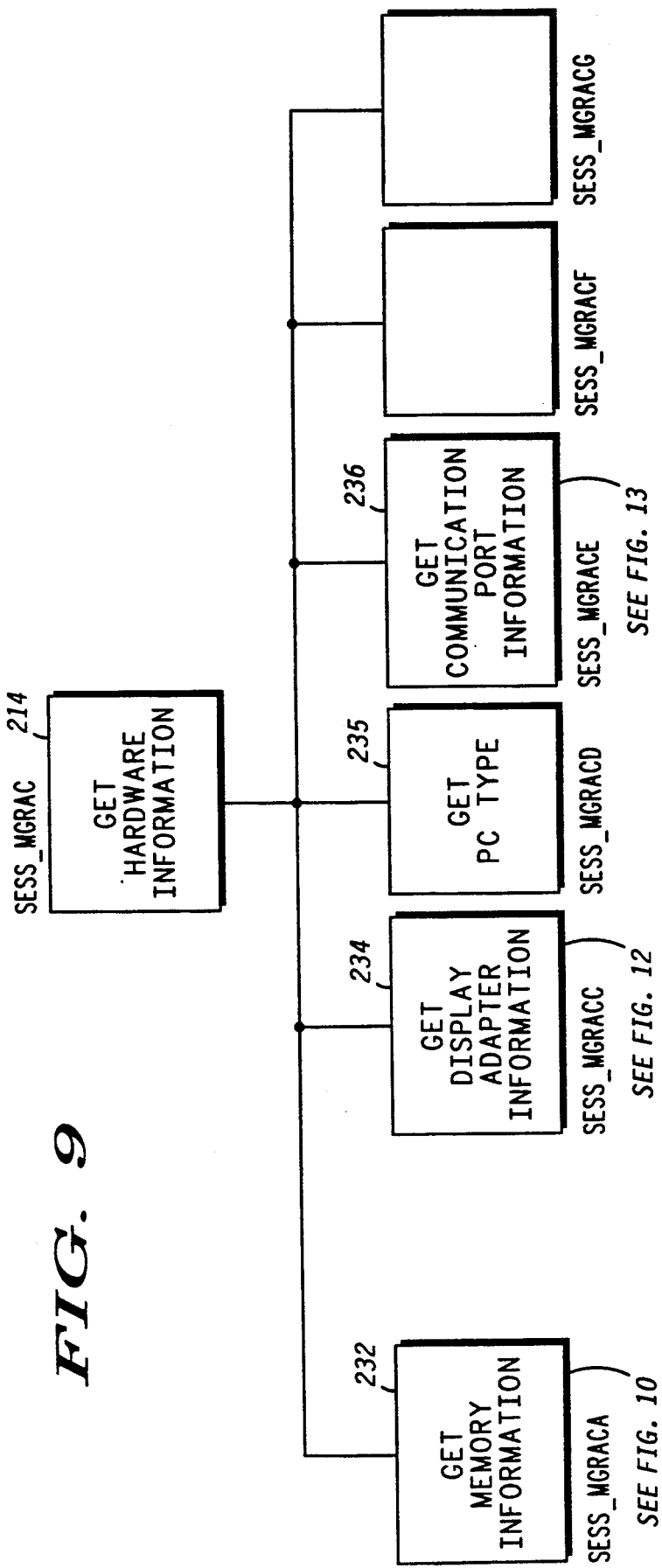
FIG. 9 shows a procedure call-tree for the routine GET HARDWARE INFORMATION in accordance with a preferred embodiment of the invention.

The pseudo-code listing for FIG. 9 comprises a procedure call-tree for the routine GET HARDWARE INFORMATION 214. The procedure GET HARDWARE INFORMATION 214 calls routines GET MEMORY INFORMATION 232, GET DISPLAY ADAPTER INFORMATION 234, GET PC TYPE 235, and GET COMM PORT INFORMATION 236.

```
GET MEMORY INFORMATION [A]
GET DISPLAY ADAPTER INFORMATION [C]
GET PC TYPE [D]
GET COMM PORT INFORMATION [E]
           Box SESS_MGRACA
```

Figure 10:
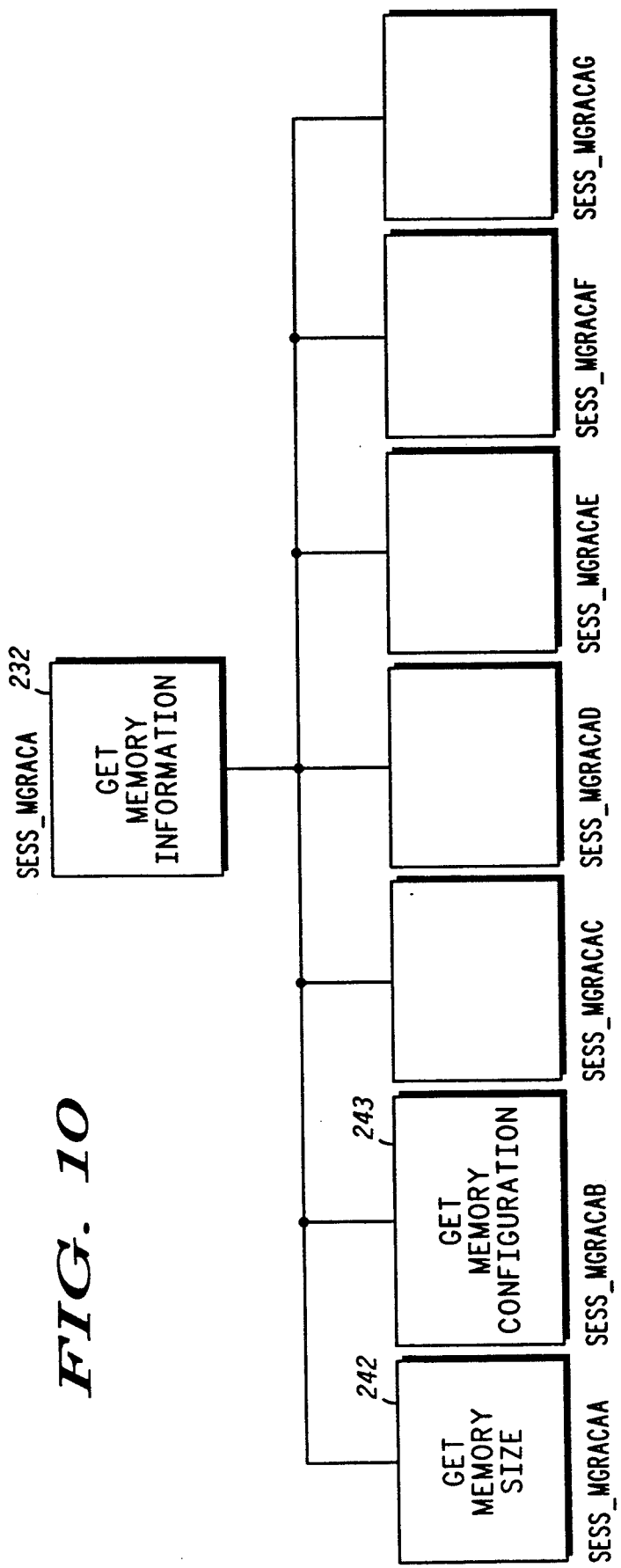
FIG. 10 shows a procedure call-tree for the routine GET MEMORY INFORMATION in accordance with a preferred embodiment of the invention.

The pseudo-code listing for FIG. 10 comprises a procedure call-tree for the routine GET MEMORY INFORMATION 232. The procedure GET MEMORY INFORMATION 232 calls the sub-procedures, GET MEMORY SIZE 242 and GET MEMORY CONFIGURATION 243, to check whether memory minimal requirements are met. If there is not enough memory, an error message is displayed to the USER 126.

```
/* Check whether memory minimal requirements are met */
GET MEMORY SIZE [A]
GET MEMORY CONFIGURATION [B]
IF not enough memory available
  THEN
    display error message
    exit
ENDIF
              Box SESS_MGRACAA
```

The pseudo-code listing for GET MEMORY SIZE 42 is shown below.

```
Get total memory size available for user applications,
i.e. maximum memory minus the memory size occupied by
DOS, TSR's etc.
```

The pseudo-code listing for GET MEMORY CONFIGURATION 243 is shown below.

```
Get the current configuration of memory
  main memory
  expended memory
          Box SESS_MGRACC
```

Figure 11:
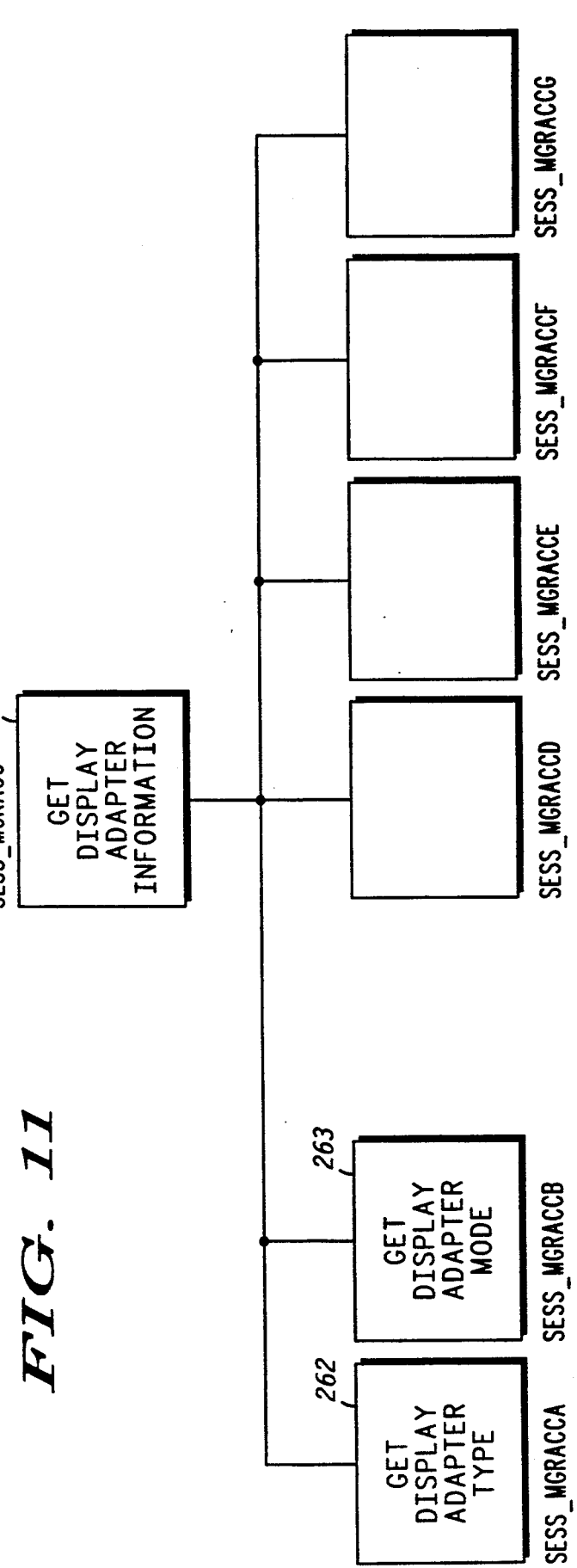
FIG. 11 shows a procedure call-tree for the routine GET DISPLAY ADAPTER INFORMATION in accordance with a preferred embodiment of the invention.

The pseudo-code listing for FIG. 11 comprises a procedure call-tree for the routine GET DISPLAY ADAPTER INFORMATION 234. The procedure GET DISPLAY ADAPTER INFORMATION 234 calls the sub-procedures, GET DISPLAY ADAPTER TYPE 262 and GET DISPLAY ADAPTER MODE 263, in the sequence indicated in the pseudo-code listing below. The original display setting is saved so that it can be restored when the Session Manager is terminated.

```
GET DISPLAY ADAPTER TYPE [A] : may be MDA,CGA,EGA,MCGA,VGA
GET DISPLAY ADAPTER MODE [B] : TEXT,GRAPHICS (BW40,BW80,CO40,CO80)
No specific/minimal requirement for the display type and mode
Save original display setting in order to restore it once session manager
is terminated
```

-continued

Box SESS_MGRACCA

The routine GET DISPLAY ADAPTER TYPE 262 (FIG. 11) retrieves the current display adapter type.

serial port configuration is saved so that it can be restored when the Session Manager is terminated.

```
GET COMM PORT ADDRESSES [A] : COM1,COM2 etc.
GET COMM PORT CONFIGURATION [B] : Baud rate,stop bit,parity etc.
IF no serial port is available
    THEN
        Display an error message
        exit
ENDIF
Save original serial port configuration in order to restore it once
session manager is removed
                                                    Box SESS_MGRACEA
```

Box SESS_MGRACCB

The pseudo-code listing for GET PC TYPE 235 (FIG. 9) is shown below. If the type of data processor is an IBM TM or compatible PC TM (Personal Computer), it must be at least the XT TM version or later; otherwise; an error message is displayed via the Notification Manager 40 and execution terminates.

```
Possible PC types that are PC,XT,AT,XT286
IF the PC type == PC
    THEN
        Display error message
        exit
ENDIF
                                Box SESS_MGRACE
```

Figure 12:
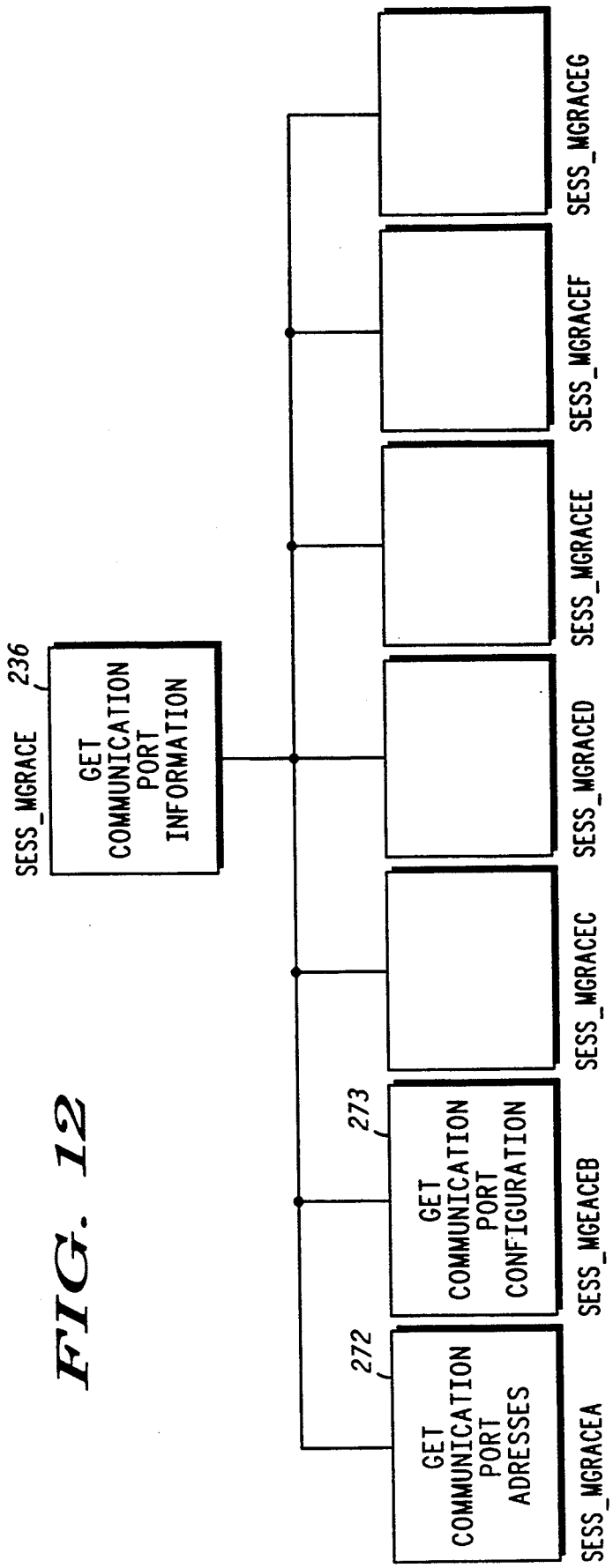
FIG. 12 shows a procedure call-tree for the routine GET COMM PORT INFORMATION in accordance with a preferred embodiment of the invention.

The pseudo-code listing for FIG. 12 comprises a procedure call-tree for the routine GET COMM PORT INFORMATION 236. The procedure GET COMM PORT INFORMATION 236 calls the sub-procedures, GET COMM PORT ADDRESSES 272 and GET COMM PORT CONFIGURATION 273, in the sequence indicated in the pseudode listing below. If no serial port is available, then an error message is displayed via the Notification Manager 40. The original The routine GET COMM PORT ADDRESSES 272 (FIG. 12) retrieves the standard DOS COM Port 101 (FIG. 5) addresses.

Box SESS_MGRACEB

The routine GET COMM PORT CONFIGURATION 273 (FIG. 12) retrieves the configuration (e.g. baud rate, parity, stop bits) for each port and stores it in memory, RAM 8 (FIG. 2).

Box SESS_MGRAE

Figure 13:
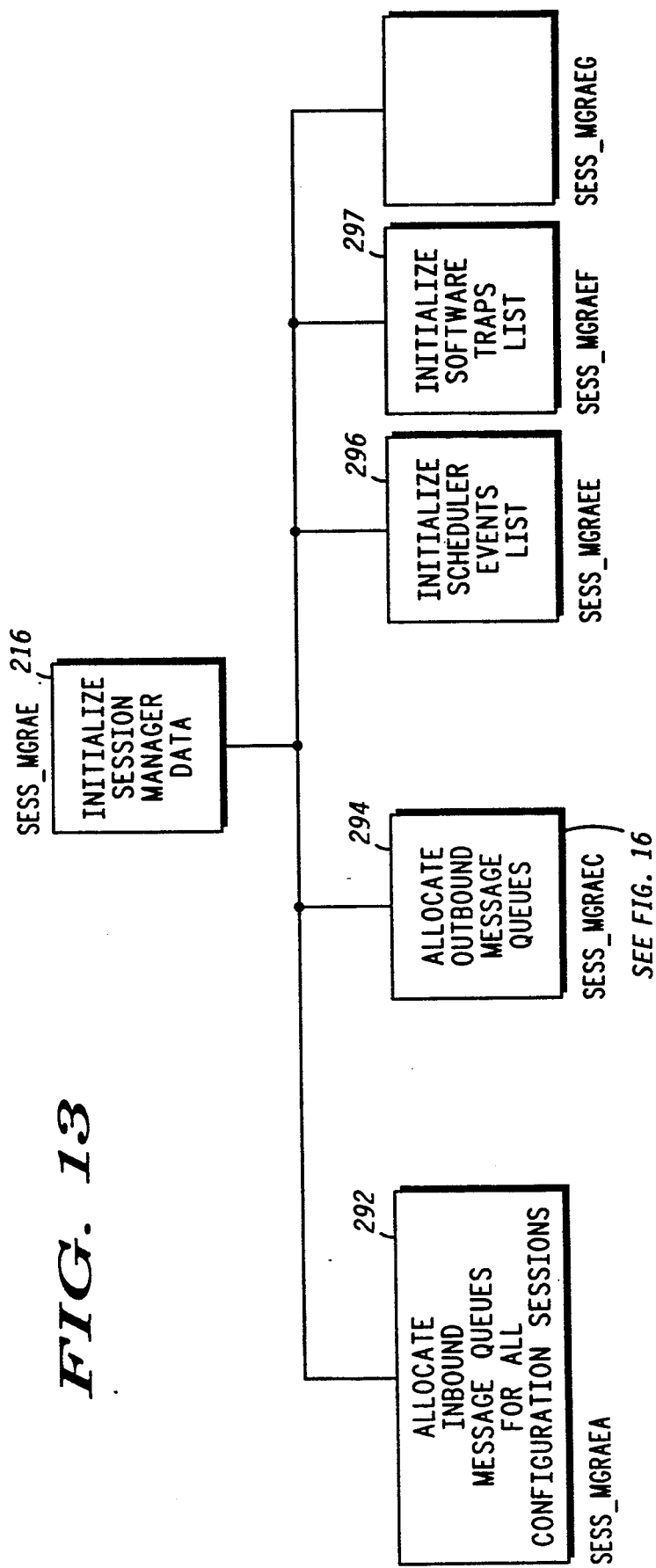
FIG. 13 shows a procedure call-tree for the routine INITIALIZE SESSION MANAGER DATA in accordance with a preferred embodiment of the invention.

The pseudo-code listing for FIG. 13 comprises a procedure call-tree for the routine INITIALIZE SESSION MANAGER DATA 216. The procedure INITIALIZE SESSION MANAGER DATA 216 calls the sub-procedures, ALLOCATE INBOUND MESSAGE QUEUES FOR ALL CONFIG SESSIONS 292, ALLOCATE OUTBOUND MESSAGE QUEUES 294, INITIALIZE SCHEDULER EVENTS LIST 296, and INITIALIZE SOFTWARE TRAPS LIST 297, in the sequence indicated in the pseudo-code listing below.

```
ALLOCATE INBOUND MESSAGE QUEUES FOR ALL CONFIG SESSIONS [A]
ALLOCATE OUTBOUND MESSAGE QUEUES [C]
INITIALIZE SCHEDULER EVENTS LIST [E]
INITIALIZE SOFTWARE TRAPS LIST [F]
                                                    Box SESS_MGRAEA
```

The expanded pseudo-code listing for ALLOCATE OUTBOUND MESSAGE QUEUES FOR ALL CONFIG SESSIONS 292 is shown below and is described in sufficient detail without further explanation.

```
All sessions' inbound queues are handled in one pool.
Messages of a session are kept in a linked list.
Two pointers point to the head and tail of the memory pool.
A message is read from the serial port only if there is enough queue pool
    memory to store it(space is reserved for at least one message of maximum
    size i.e. 2K)
For each queue the following information is kept:
    Number of messages in the queue
    Number of bytes occupied by the queue messages
    Pointer to the queue start
Each message is composed of the actual data and an extra word pointing to
    the next message in the queue.
Once the queue is full no more messages are read from the serial port,
    letting the Shared Data Communication Device 30 (FIG. 5) NAK messages as
    its queues are overflown.
A message is issued to the user suggesting that no more room for messages
    is available in the session manager queues and unless an
    application reads some of the waiting messages, new incoming host
    messages will be NAKed.
```

-continued

```
In the cases of a graceful shutdown, all queue content is saved into files
  to be restored in case that the session manager is activated again.
                        Box SESS_MGRAEC
```

Figure 14:
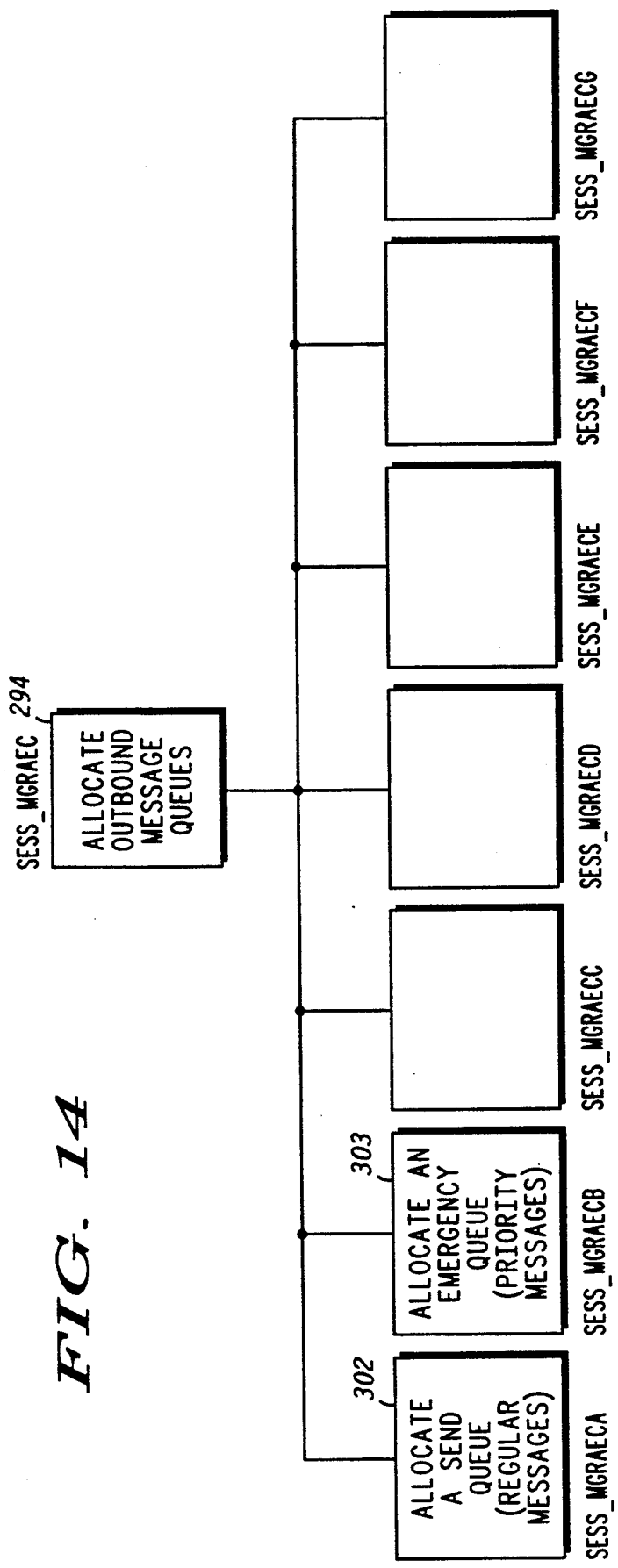
FIG. 14 shows a procedure call-tree for the routine ALLOCATE OUTBOUND MESSAGE QUEUES in accordance with a preferred embodiment of the invention.

The pseudo-code listing for FIG. 14 comprises a procedure call-tree for the routine ALLOCATE OUTBAND MESSAGE QUEUES 294. The procedure ALLOCATE OUTBOUND MESSAGE QUEUES 294 calls the sub-procedures, ALLOCATE A SEND QUEUE (REGULAR MESSAGES) 302 and ALLOCATE AN EMERGENCY QUEUE (PRIORITY MESSAGES) 303, in the sequence indicated in the pseudo-code listing below. If an error occurs during the memory allocation for either queue, then an error message is displayed via the Notification Manager 40 and program startup is terminated.

```
Same as in function ALLOCATE A SEND QUEUE (REGULAR MESSAGES).
                        Box SESS_MGRAEE
```

```
ALLOCATE A SEND QUEUE (REGULAR MESSAGES) [A]
IF memory allocation error
THEN
    Display error message
    exit
ENDIF
ALLOCATE AN EMERGENCY QUEUE (PRIORITY MESSAGES) [B]
IF memory allocation error
    THEN
       Display error message
       exit
ENDIF
                        Box SESS_MGRAECA
```

The expanded pseudo-code listing for ALLOCATE A SEND QUEUE (REGULAR MESSAGES) 302 is shown below and is described in sufficient detail without further explanation.

```
Outbound messages are kept in a linked list.
Two pointers point to the head and tail of the memory pool allocated for
    the queue
A message is accepted and stored in this queue only if there is enough
    for it, otherwise the session manager will return an error status
    code to the application
For each queue the following information is kept:
    Number of messages in the queue
    Number of bytes occupied by the queue messages
    Pointer to the queue start
Each message is composed of the actual data and an extra word pointing to
    the next message in the queue.
When the queue is full no more messages are stored in it, letting the
    the session manager NAK the application "send" requests
A message is issued to the user indicating that something is wrong (host
    not available, Shared Data Communication Device 30 (FIG. 5) low
    battery, etc.)
Unless some action is taken to fix the problem source no messages will be
    stored by the session manager to be sent to the host.
In case of graceful shutdown all queue content is saved into a file to be
    restored in case the session manager is activated again.
                        Box SESS_MGRAECB
```

The expanded pseudo-code listing for ALLOCATE AN EMERGENCY QUEUE (PRIORITY MESSAGES) 303 is the same as in routine ALLOCATE ASEND QUEUE (REGULAR MESSAGES) 302 and is shown above. The pseudo-code is described in sufficient detail without further explanation.

The pseudo-code listing for INITIALIZE SCHEDULER EVENTS LIST 296 (FIG. 13) is shown below. The routine INITIALIZE SCHEDULER EVENTS LIST 296 calls the scheduler (such as CodeRunneR ®, which is commercially available from Microsystems Software, Inc., Framingham, MA) to install the scheduler for real-time events handling. When the installation is complete, the events record for the Receive Task 107 (FIG. 5), the Transmit Task 108 (FIG. 5), and the Notification Task 124 (FIG. 4) is created.

```
Call CodeRunneR's INSTALL_SCH(service,stack_size,lock_mask) in order to
activate the scheduler
                        Box SESS_MGRAEF
```

The pseudo-code listing for INITIALIZE SOFTWARE TRAPS LIST 297 (FIG. 13) is shown below.

The routine INITIALIZE SOFTWARE TRAPS

LIST 297 calls the scheduler to install the API Manager 44 (FIG. 4) software interrupt trap routine. The software trap will be invoked when an application issues a request for an API service to the API ISR 116.

```
Call CodeRunneR's INSTALL_TRAP(trap_service,stack_size,lock_mask) in order to
make software traps handling available
                        Box SESS_MGRAF
```

Figure 15:
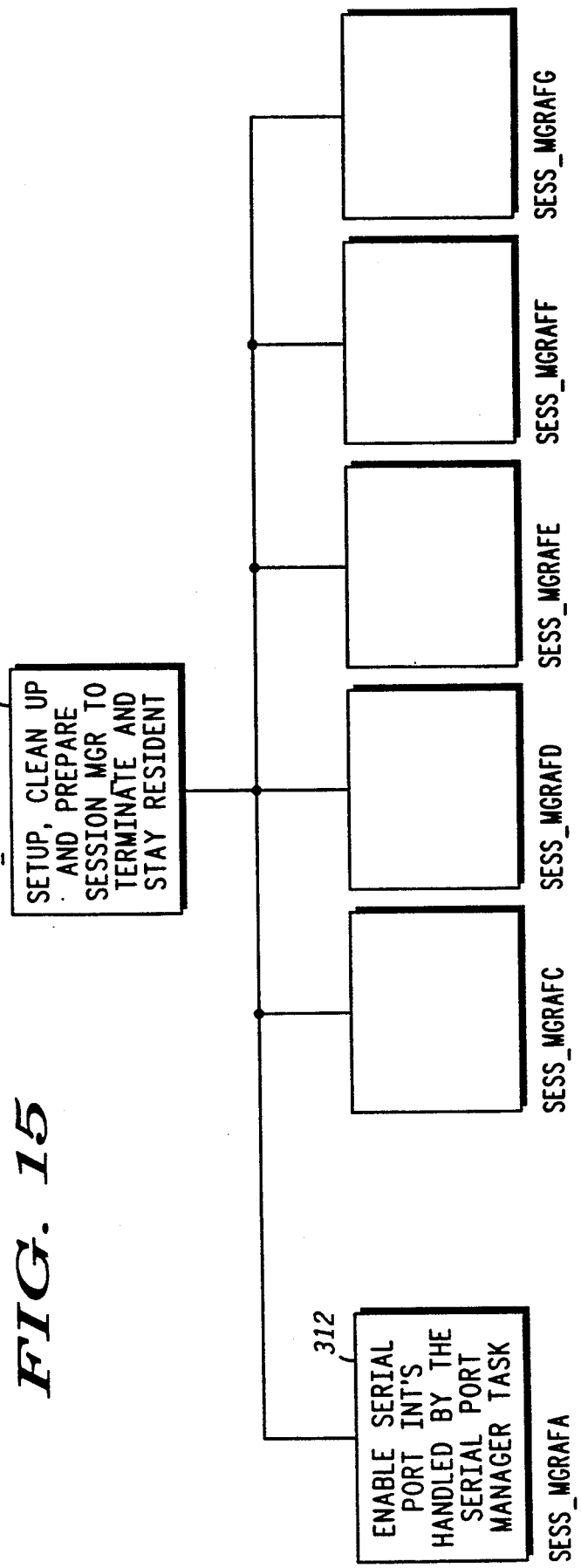
FIG. 15 shows a procedure call-tree for the routine SETUP, CLEAN UP, AND PREPARE SESSION_MGR TO TERMINATE AND STAY RESIDENT in accordance with a preferred embodiment of the invention.

The pseudo-code listing for FIG. 15 comprises a procedure call-tree for the routine SETUP, CLEAN UP, AND PREPARE SESSION_MGR TO TERMINATE AND STAY RESIDENT 217. The procedure SETUP, CLEAN UP, AND PREPARE SESSION_MGR TO TERMINATE AND STAY RESIDENT 217 calls the sub-procedure ENABLE SERIAL PORT INT'S HANDLED BY THE SERIAL PORT MANAGER TASK 312.

```
ENABLE SERIAL PORT INT'S HANDLED BY THE SERIAL PORT MANAGER TASK [A]
                        Box SESS_MGRAFA
```

The expanded pseudo-code listing for ENABLE SERIAL PORT INT'S HANDLED BY THE SERIAL PORT EAGER TASK 312 is shown below. The pseudo-code is described in sufficient detail without further explanation.

```
Initialize the serial port setting all the related parameters (baud, parity,
stop bits etc.)
                        Box SESS_MGRAG
```

The expanded pseudo-code listing for DISPLAY SIGN ON SCREEN 218 (FIG. 7) is shown below. The pseudo-code is described in sufficient detail without further explanation.

```
The sign on screen is displayed once the program is terminated and stays
resident.
The sign on screen is the product logo.
In the sign on screen, the name of the product and the version number is
displayed.
                        Box SESS_MGRB
```

The pseudo-code listing for HANDLE INBOUND MESSAGES 203 (FIG. 6) is shown below. When the scheduler interrupt is received, the routine begins execution. If at any point the routine "exits", execution stops until the next scheduler interrupt is received.

In order to enable multiple applications 20, 22 to share a single Shared Data Communication Device 30 (FIG. 5), the invention has identified each application's communication "channel" as a session. A current session is the session that has control of the CPU 10 (FIG. 2) at that particular time. The invention employs loops and other program controls, as described below, to enable effective sharing of CPU time for all of the applications 20, 22, or sessions, that have a need to share the single Shared Data Communication Device 30 (FIG. 5).

The routine first checks to see if any serial data is available, and if not, the routine exits and waits for the next scheduler interrupt. Otherwise, a loop is entered until the current session equals the start session—the first session that was originally processed. First the Shared Data Communication Device 30 (FIG. 5) is checked to get the number of waiting messages for the current session. If no messages are waiting for the current session, the next session in the cycle is checked for waiting messages.

If there are messages waiting for the current session, they are read from the Receive Buffer 104 (FIG. 5), until it is empty, and copied into the current session's in-bound queue. That queue's pointers and counters are updated. A notification data structure is created by the Receive Task 107 (FIG. 5), and the application is notified directly (via interrupt) or it may be notified indirectly via the Notification Manager 40, that the current session has messages, or responses to messages, waiting.

The current session is set to the next session in the cycle, the serial COM Port 101 (FIG. 5) is made available, and the routine exits, until the next scheduler interrupt occurs. This loop is performed until all sessions (applications) utilizing the invention have been serviced by processing the received messages.

```
/* When EXIT is used this routine Terminates and Stays Resident until next
event resumes it */
UPON INTERRUPT from the scheduler(periodic)
    EXECUTE
        IF no serial data is available (flag is set)
            THEN exit
        ENDIF
        start_session = current_session
        REPEAT
            In local command mode query a predetermined register to get number
            of waiting messages for the session
            IF no waiting messages THEN
                THEN
                    set current_session to the next session
```

```
        ELSE /* Messages are waiting so process these messages */
            Go on-line for the current session
                (which is already at handshake mode)
            Delay for X time
                (In order to let the Shared Data Communication Device 30
                (FIG. 5) send automatically stored session's
                messages to the DTE)
            WHILE (DTE receive buffer is not empty)
                DO
                    Read message (Which may be response or data)
                    Copy message into the session queue on the DTE
                    Update queue counters, pointers etc.
            ENDWHILE
            Go off-line into local command mode
            Create a notification data structure for the current session
                Name of application to notify
                Session number which is being used by the application
                Number of waiting messages
            IF direct notification set for current session
                THEN
                    Notify the foreground application directly
                        (setting a flag,using an interrupt call,...)
            ENDIF
            Set a notification event for the notification routine
                (To perform the indirect notification)
            Set current_session to the next session in the cycle
            Unblock the serial port
            exit /* Hibernate until next time being executed */
        ENDIF
    UNTIL ( current_session EQ start_session )
    ENDUNTIL
ENDEXECUTE
                Box SESS_MGRC
```

The pseudo-code listing for HANDLE SERIAL PORT INTERRUPTS 204 (FIG. 6) is shown below. When a serial port interrupt is received, the routine begins execution. If the serial port interrupt is "transmit ready", then the next byte from the Transmit Buffer 105 (FIG. 5) was transmitted.

If the serial port interrupt is "received byte", a data byte is read from the serial COM Port 101 (FIG. 5) and stored in the next free space in the Receive Buffer 104 (FIG. 5). Then a flag is set to indicate the arrival of serial data.

```
UPON INTERRUPT from serial port
    EXECUTE
        CASE OF serial port interrupt DO
            CASE transmit ready :
                Next byte from the transmit buffer is transmitted
            CASE received byte :
                Byte is read and stored into the next free slot in the
                receive buffer
                Set a flag to specify the arrival of serial data
        ENDCASE
    ENDEXECUTE
                Box SESS_MGRD
```

The pseudo-code listing for HANDLE OUTBOUND MESSAGES 205 (FIG. 6) is shown below. When a scheduler interrupt for the Transmit Task 108 (FIG. 5) is received, the routine begins execution.

The routine begins by processing the Emergency (priority) Queue 115 (FIG. 4) first. The routine gets the priority message from the Emergency Queue 115 (FIG. 4) and sends it to the Shared Data Communication Device 30 (FIG. 5). The routine then receives a return status from the Shared Data Communication Device 30 (FIG. 5) indicating whether the send was successful. The Emergency Queue 115 (FIG. 4) variables are updated, and the message is cleared from the Emergency Queue 115 (FIG. 4). The routine continues processing the Emergency Queue 115 (FIG. 4) until it is empty. The routine exits, giving up control for other tasks which may be scheduled to run, after each priority message is processed, in order to handle any waiting incoming messages. The CPU 10 (FIG. 2) then returns control to this routine to continue emptying the Emergency Queue 115 (FIG. 4).

The routine then repeats the same processing detailed above with the Regular Queue 114 (FIG. 4). The routine continues procession the Regular queue 114 (FIG. 4) until it is empty. The routine Terminates and Stays Resident (TSR) after each regular message is processed, in order to handle any waiting incoming messages or emergency outgoing messages. The CPU 10 (FIG. 2) then returns control to this routine to continue emptying the Regular Queue 114 (FIG. 4).

When the Regular Queue 114 (FIG. 4) has been emptied, and all regular messages have been sent, processing stops for this routine until the next schedular interrupt is received.

```
COMMENT
    An event is set to resume this task once the user application
    issues a "send message" service request. The scheduled event will
    resume this task only if the CPU is free, otherwise it will occur each
    clock tick until the CPU is release
ENDCOMMENT
/* When EXIT is used this routine exits until the next scheduler event
    resumes it */
UPON INTERRUPT from the scheduler
```

-continued
```
EXECUTE
    /* First handle emergency messages queue */
    IF emergency queue is not empty
        Get message from queue
        Send the message to the shared data communication device
        Get return status specifying that the message was successfully
            sent to the shared data communication device
        Update emergency queue related variables/counters
            (# of messages, # of bytes used, head & tail pointers etc.)
        Discard message from queue
    ENDIF
    /* Handled non-emergency messages queue */
    IF send queue is not empty
        Get message from queue
        Send the message to the shared data communication device
        Get return status specifying that the message was successfully
            sent to the shared data communication device
        Update send queue related variable/counters
            (# of messages, # of bytes used, head & tail pointers etc.)
        Discard message from queue
        EXIT
    ENDIF
ENDEXECUTE
                    Box SESS_MGRE
```

Figure 16:
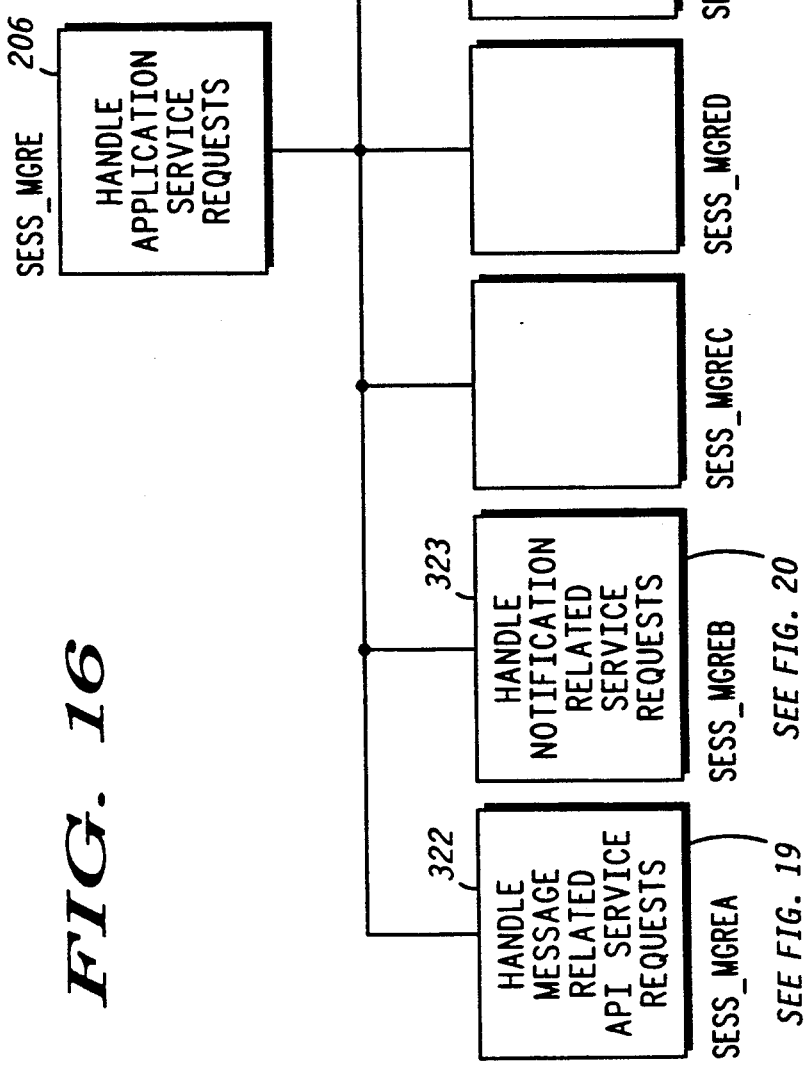
FIG. 16 shows a procedure call-tree for the routine HANDLE APPLICATION SERVICE REQUESTS in accordance with a preferred embodiment of the invention.

The pseudo-code listing for FIG. 16 comprises a procedure call-tree for the routine HANDLE APPLICATION SERVICE REQUESTS 206. The procedure HANDLE APPLICATION SERVICE REQUESTS 206 calls the sub-procedures, HANDLE MESSAGE RELATED SERVICE REQUESTS 322 and HANDLE NOTIFICATION RELATED SERVICE REQUESTS 323, in the sequence indicated in the pseudo-code listing below. When an application interrupt is received, the routine begins execution.

```
IF application request is message related
    THEN
        HANDLE MESSAGE RELATED SERVICE REQUESTS [A]
ENDIF
IF application request is notification related
    THEN
        HANDLE NOTIFICATION RELATED SERVICE REQUESTS [B]
ENDID
                    Box SESS_MGREA
```

Figure 17:
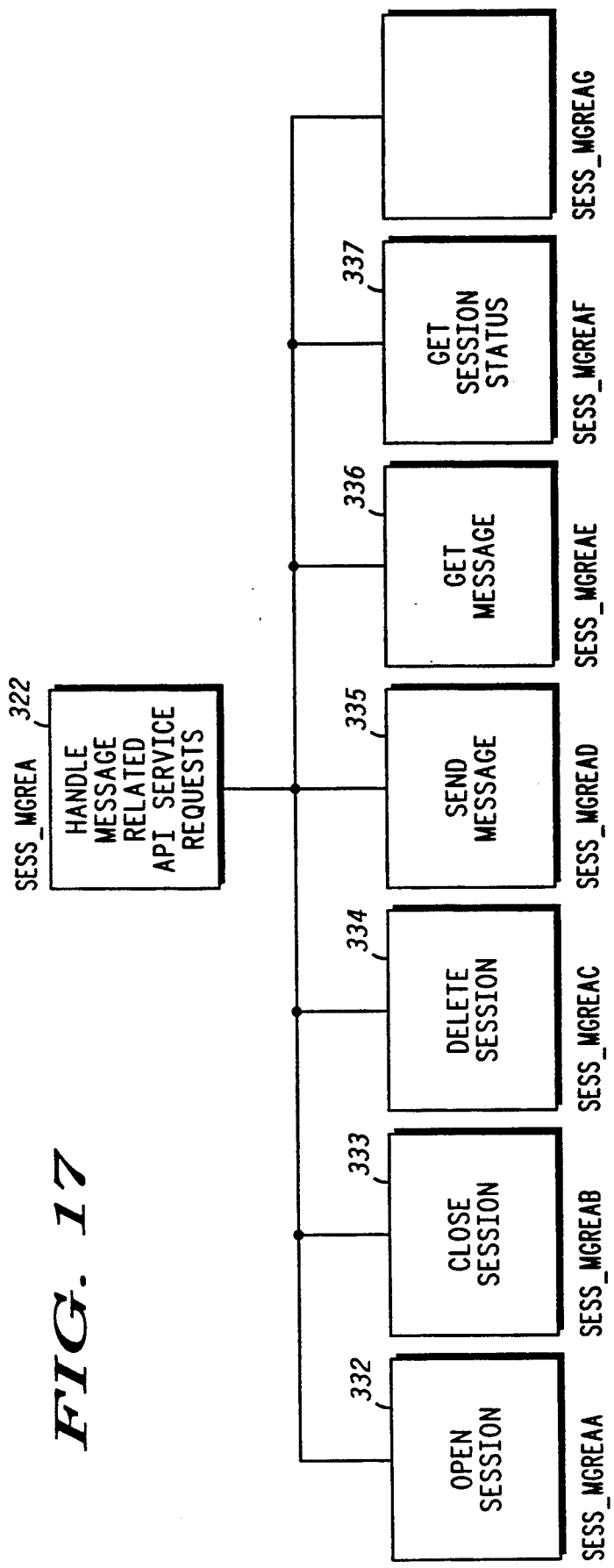
FIG. 17 shows a procedure call-tree for the routine HANDLE MAILBOX API SERVICE REQUESTS in accordance with a preferred embodiment of the invention.

The pseudo-code listing for FIG. 17 comprises a procedure call-tree for the routine HANDLE MESSAGE RELATED SERVICE REQUESTS 322. The procedure HANDLE MESSAGE RELATED SERVICE REQUESTS 322 calls the sub-procedures, OPEN SESSION 332, CLOSE SESSION 333, DELETE SESSION 334, SEND MESSAGE 335, GET MESSAGE 336, and GET SESSION STATUS 337, when the request type is "open", "close", "delete", "send", "get", and "status", respectively.

```
CASE OF request type DO
    CASE open :
        OPEN SESSION [A]
    CASE close :
        CLOSE SESSION [B]
    CASE delete :
        DELETE SESSION [C]
    CASE send :
        SEND MESSAGE [D]
    CASE get :
        GET MESSAGE [E]
    CASE status :
        GET SESSION STATUS [F]
ENDCASE
```
                    Box SESS_MGREAA The pseudo-code listing for OPEN SESSION 332 (FIG. 17) is shown below. The pseudo-code is described in sufficient detail without further explanation.

```
Open an application's session and mark it active
Allocate and initiate session queues
Return a session handle
                    Box SESS_MGREAB
```

The pseudo-code listing for CLOSE SESSION 333 (FIG. 17) is shown below. The pseudo-code is described in sufficient detail without further explanation.

```
Use a session handle to mark the session suspended
Keep handling session queues and inbound (received) messages
                    Box SESS_MGREAC
```

The pseudo-code listing for DELETE SESSION 334 (FIG. 17) is shown below. The pseudo-code is described in sufficient detail without further explanation.

```
Identify session by its handle and mark it deleted
Empty all session queues and deallocate queue's memory
/* All queued messages are lost */
The user is requested to confirm session deletion
                    Box SESS13MGREAD
```

The pseudo-code listing for SEND MESSAGE 335 (FIG. 17) is shown below. The pseudo-code is described in sufficient detail without further explanation.

```
Get a data buffer to be sent as a message
Copy the data buffer content into a local data buffer
Store the message in the proper session's queue according to priority (i.e.
emergency, regular)
                      Box SESS_MGREAE
```

The pseudo-code listing for GET MESSAGE 336 (FIG. 17) is shown below. The pseudo-code is described in sufficient detail without further explanation.

```
Get a message (if one exists) from the proper session's queue (i.e. a message
or response)
Copy the message to the application's data buffer allocated by the application
Discard message from the local queues
                      Box SESS_MGREAF
```

The pseudo-code listing for GET SESSION STATUS 337 (FIG. 17) is shown below. The pseudo-code is described in sufficient detail without further explanation.

```
Return status information regarding the session, such as number
of stored messages in each queue, session active/suspended status,
etc.
                      Box SeSS_MGREB
```

Figure 18:
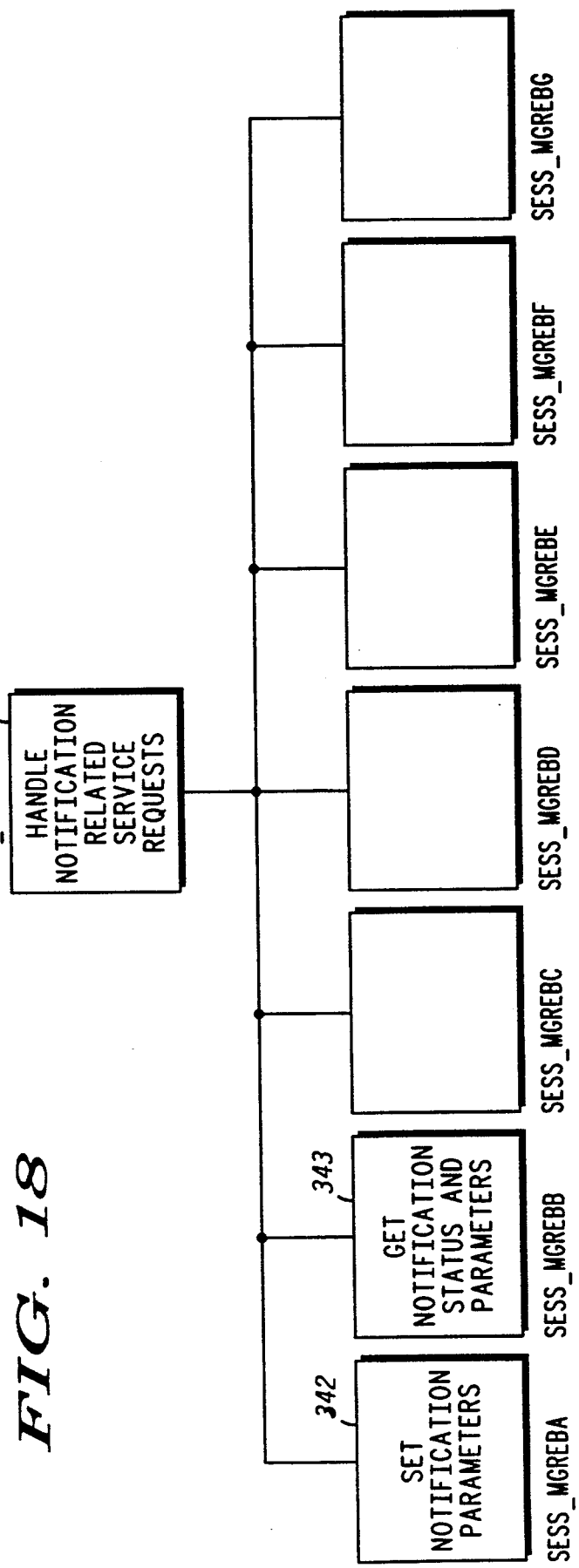
FIG. 18 shows a procedure call-tree for the routine HANDLE NOTIFICATION SERVICE REQUESTS in accordance with a preferred embodiment of the invention.

The pseudo-code listing for FIG. 18 comprises a procedure call-tree for the routine HANDLE NOTIFICATION RELATED SERVICE REQUESTS 323. The procedure HANDLE NOTIFICATION RELATED SERVICE REQUESTS 323 calls the sub-procedures, SET NOTIFICATION PARAMETERS 342 and GET NOTIFICATION STATUS AND PARAMETERS 343, when the request type is "set parameters" or "get status", respectively.

```
CASE OF request type DO
   CASE set parameters :
      SET NOTIFICATION PARAMETERS [A]
   CASE get status :
      GET NOTIFICATION STATUS AND PARAMETERS [B]
ENDCASE
                      SESS_MGREBA
```

The pseudo-code listing for SET NOTIFICATION PARAMETERS 342. (FIG. 18) is shown below. The pseudo-code is described in sufficient detail without further explanation.

```
Get the new values for the notification attributes such as visual notification,
audible notification, and direct notification
Store the values in the Session Manager configuration record
                      Box SESS_MGREBB
```

The pseudo-code listing for GET NOTIFICATION STATUS AND PARAMETERS 343 (FIG. 18) is shown below. The pseudo-code is described in sufficient detail without further explanation.

```
Fetch the requested value of the notification attribute from the Session Manager
configuration record.
Return the requested attribute to the requesting application.
                      Box SESS_MGRF
```

Figure 19:
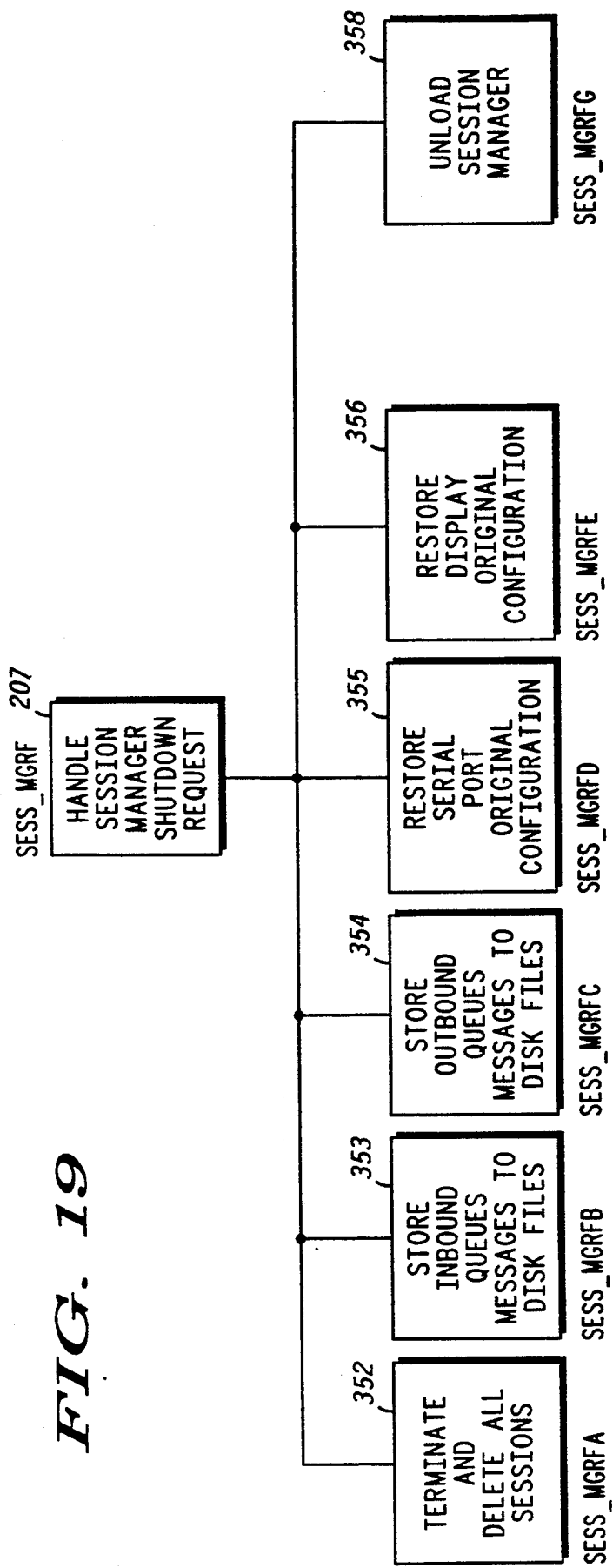
FIG. 19 shows a procedure call-tree for the routine HANDLE SESSION EAGER SHUTDOWN REQUESTS in accordance with a preferred embodiment of the invention.

The pseudo-code listing for FIG. 19 comprises a procedure call-tree for the routine HANDLE SESSION MANAGER SHUTDOWN REQUEST 207. The procedure HANDLE SESSION MANAGER SHUTDOWN REQUEST 207 calls the sub-procedures, TERMINATE AND DELETE ALL SESSIONS 352, STORE INBOUND QUEUES' MESSAGES TO DISK FILES 353, STORE OUTBOUND QUEUES' MESSAGES TO DISK FILES 354, RESTORE SERIAL PORT ORIGINAL CONFIGURATION 355, RESTORE DISPLAY ORIGINAL CONFIGURATION 356, and UNLOAD SESSION MANAGER 358, in the sequence indicated in the pseudo-code listing below. The pseudo-code is described in sufficient detail without further explanation.

```
/* Handle active session shutdown */
IF there is/are any active session(s)
   THEN
      TERMINATE AND QUIT ALL SESSION [A]
      STORE INBOUND QUEUE' MESSAGES TO DISK FILES [B]
      STORE OUTBOUND QUEUE' MESSAGES TO DISK FILES [C]
ENDIF
/* Restore the PC to its original configuration */
RESTORE SERIAL PORT ORIGINAL CONFIGURATION [D]
```

-continued

```
RESTORE DISPLAY ORIGINAL CONFIGURATION [E]
/* Free memory occupied by the session manager */
UNLOAD SESSION MANAGER [G]
                   Box SESS_MGRG
```

The pseudo-code listing for HANDLE APPLICATION NOTIFICATION SERVICE 208 (FIG. 6) is shown below. When a scheduler interrupt is received, the routine begins execution.

The routine retrieves the notification data for the current session. If direct notification is enabled for the current session, then the direct notification flag is set in the application address space or an application's designated call-back routine is called; otherwise, nothing is done.

The routine retrieves the internal Notification Attributes 123 (FIG. 4) to generate an indirect notification to the User 126 (FIG. 4) for the current session.

```
COMMENT
   Notification data is prepared by the Message Manager Receive Task
   as messages are being received for a session. This data is
   placed in a predetermined memory location which is accessible to this
   function.
ENDCOMMENT
UPON INTERRUPT from the scheduler indicating to invoke the Notification
Manager
   EXECUTE
      Get the current notification data structure
      (application name,session number,number of waiting messages)
      IF Direct notification is enabled for the application
         THEN
            Set direct notification flag in the application address space or
            call a dedicated call-back routine designated by the application
            to handle its notification events.
         ELSE
      ENDIF
      Look-up in Notification Attribute data store which attributes to set
      for the indirect notification(pop-up,tone,interval)
   ENDEXECUTE
```

It will be apparent to those skilled in the art that the disclosed invention may be modified in numerous ways and may assume many embodiments other than the preferred form specifically set out and described above.

For example, the transceiver devices may communicate with each other in any suitable manner, as described with reference to FIGS. 22-23.

FIG. 20 shows a block diagram depicting a pair of transceivers communicating via direct radio frequency signals in accordance with another embodiment of the invention. Devices 75 and 85 send and receive RF signals 90 directly via modems 70 and 80 to each other in order to transfer data from one to the other.

FIG. 21 shows a block diagram depicting a pair of transceivers communicating via telephone line in accordance with another embodiment of the invention. Devices 31 and 32 send and receive data to and from each other via modems 36 and 37, communications infrastructure 33, and telephone lines 34 and 38.

Figure 22:
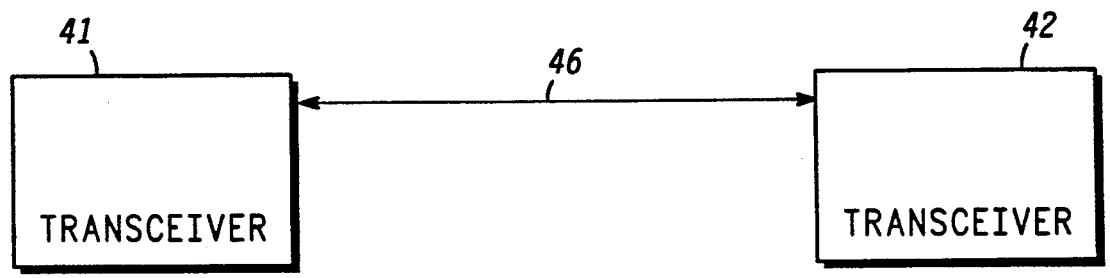
FIG. 22 shows a block diagram depicting a pair of transceivers communicating via direct wire line in accordance with another embodiment of the invention.

FIG. 22 shows a block diagram depicting a pair of transceivers communicating via direct wireline in accordance with another embodiment of the invention. Transceiver devices 41 and 42 exchange data over direct wireline 46.

Figure 23:
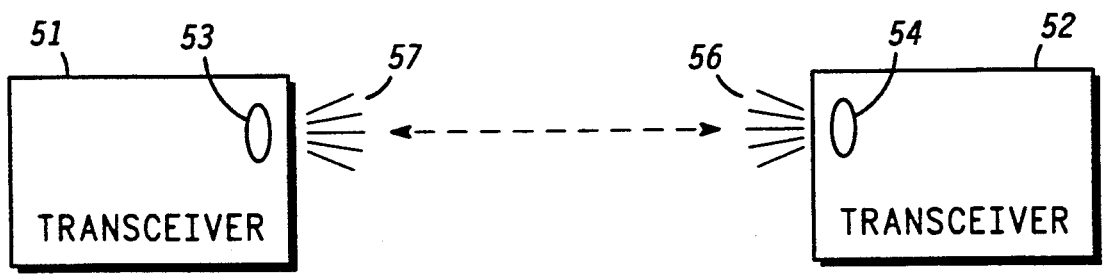
FIG. 23 shows a block diagram depicting a pair of transceivers communicating via infra-red communication links in accordance with another embodiment of the invention.

FIG. 23 shows a block diagram depicting a pair of transceivers communicating via infra-red communication links in accordance with another embodiment of the invention. Devices 51 and 52 send and receive data to and from each other via infra-red (IR) transceivers 53 and 54. The data is transferred utilizing IR signals 56 and 57.

Operation of a Preferred Embodiment

With reference now to FIGS. 3-5, the operation of the invention will be described regarding the asynchronous receipt of a message by an application.

Upon receiving data from the RF Modem 30, the COM ISR 103 in the Device Manager 48 reads it and writes it to its Receive Buffer 104. Periodically the Device State Machine Task 106 is invoked by the Scheduler 102 "looking" for new data to either receive or transmit.

When new data is found in the Receive Buffer 104, it is copied to an application's corresponding In-bound Queue 109 by the Receive Task 107 in the Message Manager 47. The data message is stored in this queue until the user 126 directs the application 20 to issue a receive command via the Command Library 24. Such an API request interrupts the API ISR 116 in the API Manager 44.

The API ISR will interpret the request and will retrieve the pending data message from the In-bound Queue 109 in the Queue Manager 47, passing it to the requesting application 20. So long as a request is not issued, the data message is stored in the Queue Manager queue. Other data messages can also be stored in the same queue before any of them are read by the application 20. Also data messages for different applications may be stored in their corresponding queues and not be lost until read. In addition, a given application may have opened more than one session, so each of its sessions is allocated a respective queue for the temporary storage of messages or commands being transmitted to or from such application.

The operation of a preferred embodiment of the invention will now be described regarding the asynchronous transmission of a message by an application. A user can use an application to send a data message, calling the API service in charge of message sending. Once control gets back to the application, the user may exit the application, perform other operations using the application, or even start sending another message.

In the background, the message is received by the API Manager 44 and written to the correct Out-Bound Queue according to its priority, regardless of what happens in the foreground. The Session Manager's Message Manager 43 will poll the outbound queues to check for something to transmit. Since in this case a data message is pending transmission, it will be removed from its queue and written into a low level Transmit Buffer 105. This buffer is polled by yet another periodical task, the COM ISR 103 which in turn sends the data message to the RF Modem 30 via the Com Port 101. The entire operation is unaffected by what the sending application may now be doing or by the currently inactive status of the sending application.

Thus it will be seen that the present invention provides a method for enabling a general-purpose subscriber unit, such as a portable computer, to receive and transmit messages to and from applications in background mode. The invention eliminates the need for an application to remain active during message transmission or reception, because it performs the transmission or reception of messages on behalf of the application, even if the application is no longer running.

The computer program portion of a preferred embodiment of the present invention incorporates a unique combination of traditional programming elements: background daemons, interprocess communication using mailboxes, client/server partitioning, operating system interprocess communication techniques, realtime programming, and wireless data communication.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In a data processing system comprising a processor, a modem, and a memory for storing a plurality of applications, at least one of which is not currently executing, and for storing a session manager for enabling a plurality of communications channels through said modem, a method for routing and delivering data messages to any of said applications, independent of user involvement, said method comprising:
   a) receiving a data message from said modem by said session manager, said data message being addressed to said at least one application;
   b) storing said message in said memory; and
   c) routing said message to said at least one application upon request,
whereby messages may be received and routed asynchronously to inactive applications.

2. The method recited in claim 1 wherein in step c) said message is automatically routed to said application.

3. The method recited in claim 1 wherein said modem is a radio frequency modem.

4. In a data processing system comprising a processor, a radio frequency modem, and a memory for storing a plurality of applications, at least one of which is not currently executing, and for storing a computer program, said computer program comprising:
   a predetermined library of commands common to all of said applications, said commands being used to control communication between said applications and said modem;
   a session manager for executing said commands and for controlling said modem; and
   a plurality of queues for storing data messages, at least one queue being allocated to each of said applications;
   a method for storing and routing data messages to any of said applications, independent of user involvement, comprising the steps of:
   a) receiving a data message from said modem by said session manager, said data message being addressed to said at least one application;
   b) storing said message in one of said queues; and
   c) routing said message to said at least one application upon execution of a command to do so,
whereby messages may be received and routed asynchronously to inactive applications.

5. The method recited in claim 4 wherein in step c) said message is automatically routed to said application in response to a command to do so by said application.

6. In a data processing system comprising a processor, a modem, and a memory for storing a plurality of applications, at least one of which is not currently executing, and for storing a session manager for enabling a plurality of communications channels through said modem, a method for transmitting data messages from any of said applications, independent of user involvement, said method comprising:
   a) generating a data message by said at least one application;
   b) receiving said data message from said at least one application by said session manager;
   c) storing said message in said memory; and
   d) routing said message to said modem;
whereby messages may be generated, routed, and transmitted asynchronously from inactive applications.

7. The method recited in claim 4 wherein said modem is a radio frequency modem.

8. In a data processing system comprising a processor, a radio frequency modem, and a memory for storing a plurality of applications, at least one of which is not currently executing, and for storing a computer program, said computer program comprising:
   a predetermined library of commands common to all of said applications, said commands being used to control communication between said applications and said modem;
   a session manager for executing said commands and for controlling said modem; and
   a plurality of queues for storing data messages, at least one queue being allocated to each of said applications;
   a method for storing and routing data messages from any of said applications to said modem, independent of user involvement, comprising the steps of:
   a) generating a data message by said at least one application to said session manager, said data message being addressed to said modem;
   b) storing said message in one of said queues; and
   c) routing said message to said modem upon execution of a command to do so,
whereby messages may be generated, routed, and transmitted asynchronously from inactive applications.

9. The method recited in claim 8 wherein in step c) said message is automatically routed from said queue in response to a command to do so by said application.

* * * * *